United States Patent
Bai et al.

(10) Patent No.: US 12,075,370 B2
(45) Date of Patent: Aug. 27, 2024

(54) SIGNALING FOR DETECTED SYNCHRONIZATION SIGNAL BLOCKS

(71) Applicant: QUALCOMM Incorporated, San Diego, CA (US)

(72) Inventors: Tianyang Bai, Bridgewater, NJ (US); Muhammad Nazmul Islam, Edison, NJ (US); Sundar Subramanian, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 639 days.

(21) Appl. No.: 15/997,398

(22) Filed: Jun. 4, 2018

(65) Prior Publication Data

US 2018/0359716 A1    Dec. 13, 2018

Related U.S. Application Data

(60) Provisional application No. 62/519,054, filed on Jun. 13, 2017.

(51) Int. Cl.
  *H04W 56/00*  (2009.01)
  *H04B 7/06*   (2006.01)
  (Continued)

(52) U.S. Cl.
  CPC ......... *H04W 56/001* (2013.01); *H04L 5/0053* (2013.01); *H04L 5/006* (2013.01);
  (Continued)

(58) Field of Classification Search
  None
  See application file for complete search history.

(56) References Cited

U.S. PATENT DOCUMENTS

| | | | |
|---|---|---|---|
| 9,949,298 B1* | 4/2018 | Akoum | H04W 74/0833 |
| 2011/0007704 A1* | 1/2011 | Swarts | H04J 11/0073 |
| | | | 370/330 |

(Continued)

FOREIGN PATENT DOCUMENTS

| | | |
|---|---|---|
| CN | 101778478 A | 7/2010 |
| CN | 104412519 A | 3/2015 |

(Continued)

OTHER PUBLICATIONS

International Search Report and Written Opinion—PCT/US2018/035989—ISA/EPO—dated Aug. 14, 2018 (174730WO).

(Continued)

*Primary Examiner* — Srinivasa R Reddivalam
(74) *Attorney, Agent, or Firm* — Holland & Hart LLP

(57) ABSTRACT

Methods, systems, and devices for wireless communication are described. Signaling of a radio frequency (RF) band associated with a synchronization signal (SS) block detected by a user equipment (UE) may be transmitted to a base station. For example, a base station may transmit a set of SS blocks to multiple UEs, where the SS blocks are frequency division multiplexed such that each SS block is transmitted in a respective RF band. A UE may receive one or more of the transmitted SS blocks and determine a preferred SS block from the received SS blocks. The UE may in turn transmit an message to the base station that indicates the RF band of the preferred SS block. In some cases, the base station may optionally transmit a request to the UE to transmit the indication of the RF band.

26 Claims, 18 Drawing Sheets

(51) Int. Cl.
*H04L 5/00* (2006.01)
*H04W 52/02* (2009.01)
*H04W 74/08* (2009.01)
*H04W 74/0833* (2024.01)

(52) U.S. Cl.
CPC ... *H04W 52/0216* (2013.01); *H04W 52/0219* (2013.01); *H04W 52/0222* (2013.01); *H04W 52/0229* (2013.01); *H04W 56/0015* (2013.01); *H04W 74/0833* (2013.01); *H04B 7/0695* (2013.01); *H04L 5/001* (2013.01); *H04L 5/0048* (2013.01)

(56) References Cited

U.S. PATENT DOCUMENTS

| | | | | |
|---|---|---|---|---|
| 2013/0121185 | A1* | 5/2013 | Li | H04B 7/0695 |
| | | | | 370/252 |
| 2014/0010178 | A1* | 1/2014 | Yu | H04W 74/004 |
| | | | | 370/329 |
| 2016/0056935 | A1* | 2/2016 | Damnjanovic | H04W 74/006 |
| | | | | 370/252 |
| 2018/0241458 | A1* | 8/2018 | Jung | H04B 7/0617 |
| 2019/0254068 | A1* | 8/2019 | Frenne | H04W 74/008 |
| 2019/0335426 | A1* | 10/2019 | Kim | H04J 11/0076 |
| 2020/0296765 | A1* | 9/2020 | Kim | H04W 74/0833 |

FOREIGN PATENT DOCUMENTS

| | | |
|---|---|---|
| CN | 105122909 A | 12/2015 |
| CN | 105850189 A | 8/2016 |
| WO | WO-2017023232 A1 | 2/2017 |

OTHER PUBLICATIONS

Nokia, et al., "On Requirements and Design of SS Burst Set and SS Block Index Indication", 3GPP TSG-RAN WG1 Meeting#88, R1-1703092, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, 15 Pages, Feb. 12, 2017, XP051210230.

* cited by examiner

SIGNALING FOR DETECTED SYNCHRONIZATION SIGNAL BLOCKS

CROSS REFERENCES

The present application for patent claims benefit of U.S. Provisional Patent Application No. 62/519,054 by Bai et al., entitled "Signaling for Detected Synchronization Signal Blocks," filed Jun. 13, 2017, assigned to the assignee hereof, and expressly incorporated by reference in its entirety.

BACKGROUND

The following relates generally to wireless communication, and more specifically to signaling of radio frequency (RF) bands for detected synchronization signal blocks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may transmit synchronization signals (SSs) to assist a UE in connecting to and communicating with a network. These SSs may be included in certain time and frequency resources (e.g., SS blocks) that are transmitted at different times and may also be multiplexed on different radio frequency (RF) bands. A UE may receive one or more SSs at different times or on different RF bands, and may then use the information in the received SS block to configure, for example, a random access message to be sent to the base station. However, when a UE transmits a random access message to the base station for accessing the network, the base station may not know the SS block the UE received (for example, the time or frequency resources corresponding to the received SS block). Accordingly, communications efficiency may be improved through techniques that enable a base station to coherently determine the RF band corresponding to an SS block received and used by a UE.

SUMMARY

The described techniques relate to improved methods, systems, devices, or apparatuses that support signaling of respective radio frequency (RF) bands for detected synchronization signal (SS) blocks. Generally, the described techniques provide for the transmission of signaling that indicates a frequency raster (e.g., an RF band) associated with an SS block detected by a user equipment (UE). For example, a base station may transmit a set of SS blocks to multiple UEs, where the SS blocks may be frequency division multiplexed such that each SS block is transmitted on a respective RF band. A UE may receive one or more of the transmitted SS blocks and determine a preferred SS block from the received SS blocks. For instance, the UE may receive multiple SS blocks and determine the preferred SS block as an SS block having a highest signal-to-noise ratio (SNR) or a highest received signal power of the multiple received SS blocks. The UE may in turn transmit an indication to the base station that indicates the RF band of the preferred SS block. In some cases, the base station may optionally transmit a request to the UE to transmit the indication of the respective RF band. For example, the base station may include the request in broadcast information sent to the UE. In any event, the base station may use the received information associated with the RF band of the SS block to perform efficient scheduling for subsequent communications with the UE.

A method of wireless communication is described. The method may include receiving, at a plurality of RF bands, one or more SS blocks from a base station, each of the one or more SS blocks being received at a respective RF band, determining a preferred SS block of the received one or more SS blocks based at least in part on a signal strength of the one or more SS blocks, and indicating to the base station the respective RF band of the preferred SS block.

An apparatus for wireless communication is described. The apparatus may include means for receiving, at a plurality of RF bands, one or more SS blocks from a base station, each of the one or more SS blocks being received at a respective RF band, means for determining a preferred SS block of the received one or more SS blocks based at least in part on a signal strength of the one or more SS blocks, and means for indicating to the base station the respective RF band of the preferred SS block.

Another apparatus for wireless communication is described. The apparatus may include a processor, memory in electronic communication with the processor, and instructions stored in the memory. The instructions may be operable to cause the processor to receive, at a plurality of RF bands, one or more SS blocks from a base station, each of the one or more SS blocks being received at a respective RF band, determine a preferred SS block of the received one or more SS blocks based at least in part on a signal strength of the one or more SS blocks, and indicate to the base station the respective RF band of the preferred SS block.

A non-transitory computer readable medium for wireless communication is described. The non-transitory computer-readable medium may include instructions operable to cause a processor to receive, at a plurality of RF bands, one or more SS blocks from a base station, each of the one or more SS blocks being received at a respective RF band, determine a preferred SS block of the received one or more SS blocks based at least in part on a signal strength of the one or more SS blocks, and indicate to the base station the respective RF band of the preferred SS block.

Some examples of the method, apparatus, and non-transitory computer-readable medium described above may further include processes, features, means, or instructions for receiving a request from the base station to transmit an indication of the respective RF band. Some examples of the method, apparatus, and non-transitory computer-readable medium described above may further include processes, features, means, or instructions for transmitting the indication based on the received request.

Some examples of the method, apparatus, and non-transitory computer-readable medium described above may further include processes, features, means, or instructions for identifying, within the request, signaling parameters comprising one or more of a format, resources, or timing for transmitting the indication. Some examples of the method, apparatus, and non-transitory computer-readable medium described above may further include processes, features, means, or instructions for transmitting the indication in accordance with the identified signaling parameters.

In some examples of the method, apparatus, and non-transitory computer-readable medium described above, the request may be received via a physical broadcast channel (PBCH). In some examples of the method, apparatus, and non-transitory computer-readable medium described above, determining the preferred SS block comprises: determining a SNR or a received signal power associated with each of the received one or more SS blocks. Some examples of the method, apparatus, and non-transitory computer-readable medium described above may further include processes, features, means, or instructions for determining the preferred SS block as an SS block having a highest SNR of the determined SNRs or as an SS block having a highest received signal power of the determined received signal powers.

In some examples of the method, apparatus, and non-transitory computer-readable medium described above, indicating the respective RF band comprises: transmitting, via a random access channel (RACH) message, an index of the respective RF band. In some examples of the method, apparatus, and non-transitory computer-readable medium described above, indicating the respective RF band comprises: transmitting an indication of a physical resource block (PRB) corresponding to the preferred SS block.

Some examples of the method, apparatus, and non-transitory computer-readable medium described above may further include processes, features, means, or instructions for determining to indicate the respective RF band based at least in part on receiving two or more SS blocks. Some examples of the method, apparatus, and non-transitory computer-readable medium described above may further include processes, features, means, or instructions for determining to indicate the respective RF band based at least in part on an SS sequence of the received one or more SS blocks.

In some examples of the method, apparatus, and non-transitory computer-readable medium described above, indicating the respective RF band comprises: determining a timing to transmit signaling responsive to receipt of the one or more SS blocks, wherein the timing may be indicative of the respective RF band. Some examples of the method, apparatus, and non-transitory computer-readable medium described above may further include processes, features, means, or instructions for transmitting the signaling in accordance with the determined timing.

A method of wireless communication is described. The method may include transmitting one or more SS blocks, each of the one or more SS blocks being transmitted at a respective RF band and receiving, from a UE, an indication of the respective RF band of at least one SS block of the transmitted one or more SS blocks received by the UE.

An apparatus for wireless communication is described. The apparatus may include means for transmitting one or more SS blocks, each of the one or more SS blocks being transmitted at a respective RF band and means for receiving, from a UE, an indication of the respective RF band of at least one SS block of the transmitted one or more SS blocks received by the UE.

Another apparatus for wireless communication is described. The apparatus may include a processor, memory in electronic communication with the processor, and instructions stored in the memory. The instructions may be operable to cause the processor to transmit one or more SS blocks, each of the one or more SS blocks being transmitted at a respective RF band and receive, from a UE, an indication of the respective RF band of at least one SS block of the transmitted one or more SS blocks received by the UE.

A non-transitory computer readable medium for wireless communication is described. The non-transitory computer-readable medium may include instructions operable to cause a processor to transmit one or more SS blocks, each of the one or more SS blocks being transmitted at a respective RF band and receive, from a UE, an indication of the respective RF band of at least one SS block of the transmitted one or more SS blocks received by the UE.

Some examples of the method, apparatus, and non-transitory computer-readable medium described above may further include processes, features, means, or instructions for transmitting a request to one or more UEs to signal the indication of the respective RF band. Some examples of the method, apparatus, and non-transitory computer-readable medium described above may further include processes, features, means, or instructions for receiving the indication based on the transmitted request.

Some examples of the method, apparatus, and non-transitory computer-readable medium described above may further include processes, features, means, or instructions for determining signaling parameters comprising one or more of a format, resources, or timing for transmitting the indication. In some examples of the method, apparatus, and non-transitory computer-readable medium described above, wherein transmitting the request comprises: transmitting the determined signaling parameters within the request to the one or more UEs.

In some examples of the method, apparatus, and non-transitory computer-readable medium described above, the request may be transmitted via a PBCH. In some examples of the method, apparatus, and non-transitory computer-readable medium described above, the at least one SS block may be a preferred SS block of the one or more SS blocks received by the UE, the preferred SS block having a highest SNR or a highest received signal power of the transmitted one or more SS blocks. In some examples of the method, apparatus, and non-transitory computer-readable medium described above, receiving the indication of the respective RF band comprises: receiving, via a RACH message, an index of the respective RF band.

In some examples of the method, apparatus, and non-transitory computer-readable medium described above, receiving the indication of the respective RF band comprises: receiving an indication of a PRB corresponding to the at least one SS block. Some examples of the method, apparatus, and non-transitory computer-readable medium described above may further include processes, features, means, or instructions for scheduling resources for communication with the UE based at least in part on the received indication of the respective RF band. Some examples of the method and apparatus described above may further include processes, features, means, or instructions for monitoring resources for communication with the UE based at least in part on the received indication of the respective RF band.

DETAILED DESCRIPTION

Figure 1:
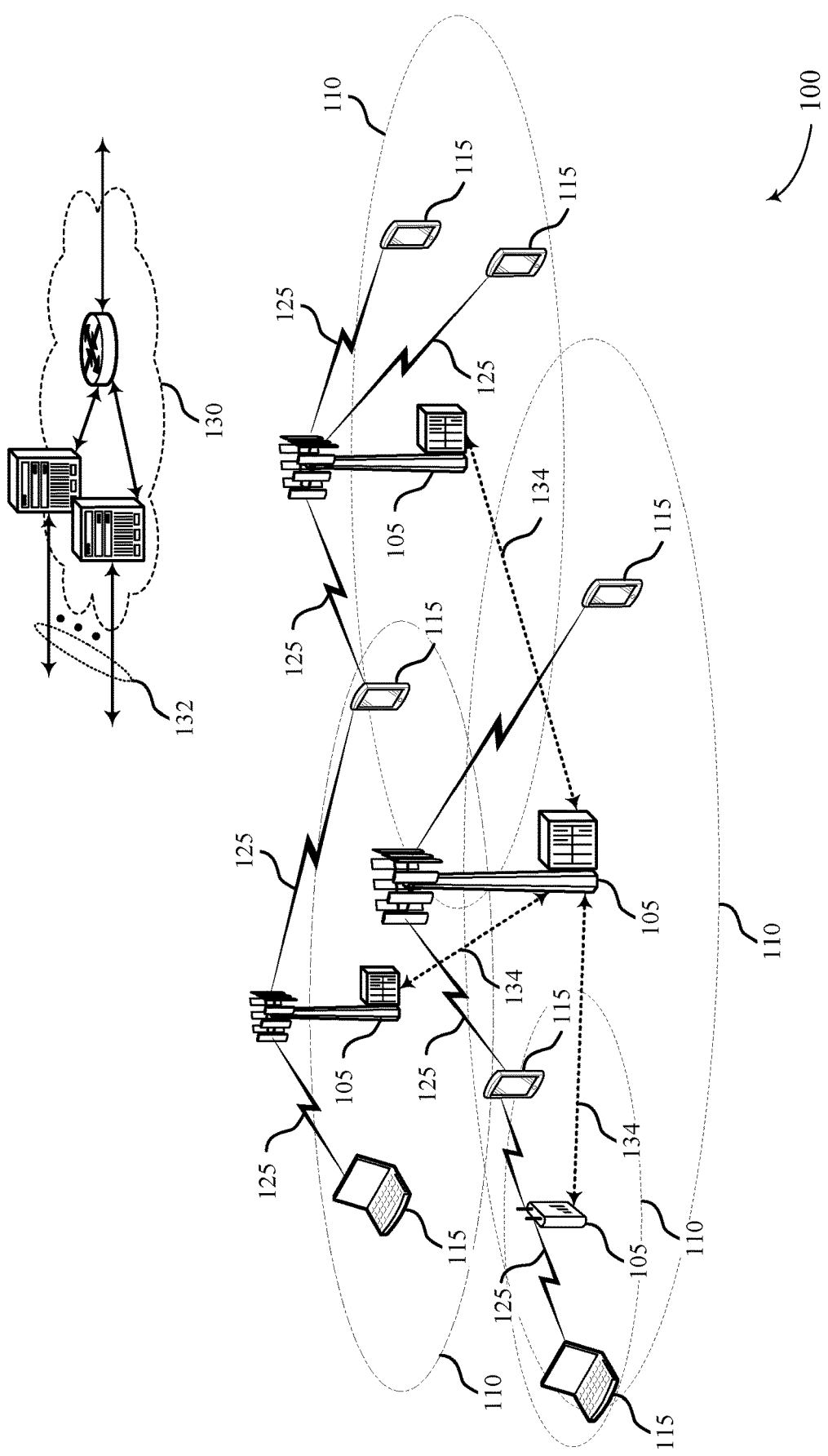
FIG. 1 illustrates an example of a system for wireless communication in accordance with aspects of the present disclosure.

In some wireless communications systems, a serving base station may transmit synchronization signals (SSs) to enable synchronization with the serving base station by a user equipment (UE). The SSs (e.g., a primary synchronization signal (PSS), secondary synchronization signal (SSS), etc.) may provide a UE with information regarding the base station's frame timing and cell identity. Accordingly, a base station may transmit SS sequences to multiple UEs, and a UE may attempt to detect the SS sequences by correlating received SS signals with the SS sequences. In some examples, the SSs may be transmitted by the base station using one or more SS blocks (e.g., time-frequency resources used for the transmission of SSs). For example, PSS, SSS, and/or broadcast information (e.g., a physical broadcast channel (PBCH)) may be transmitted within different SS blocks on respective directional beams or on different time/frequency resources, where one or more SS blocks may be included within an SS burst.

In some cases, the base station may transmit SS blocks using frequency division multiplexing (FDM), which may provide for a robust transmission scheme resilient to certain types of interference, such as frequency selective fading. After receiving one or more SS blocks sent by the base station, a UE may use information associated with a received SS block to transmit a random access message to the base station to connect to the network. However, the base station may be unable to determine a frequency raster for the SS block (e.g., a set of locations or a radio frequency (RF) band where SS signals may be transmitted) that the UE used for transmitting the random access message (e.g., due to multiple SS blocks being multiplexed in the frequency domain). Information regarding the RF band associated with a detected SS block may be useful at the base station for scheduling purposes, but in cases where the RF band information is not known by the base station, subsequent communications may not be as efficient as possible.

As described herein, a UE may transmit an indication of an RF band for a preferred SS block received by the UE. In some examples, the UE may be configured to automatically transmit the indication to the base station upon detection of one or more SS blocks. For example, a UE may receive multiple SS blocks, and the multiple SS blocks may serve as a trigger for the UE to transmit the indication of the specific RF band corresponding to a preferred SS block to the base station. The UE may determine the preferred SS block based on a received signal strength, a signal-to-noise ratio (SNR), a signal-to-interference plus noise ratio (SINR), and the like.

In some cases, the base station may explicitly request the UE transmit the indication of the respective RF band for a preferred SS block. For example, the base station may transmit signaling to the UE that indicates a request for the RF band information. The request may be included in a broadcast channel, or may be implicit based on different SS sequences included in the transmitted SS blocks.

Aspects of the disclosure are initially described in the context of a wireless communications system. Examples are also provided which describe SS block transmissions from a base station to a UE. Aspects of the disclosure are further illustrated by and described with reference to apparatus diagrams, system diagrams, and flowcharts that relate to signaling for detected synchronization signal blocks.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support signaling that indicates a respective RF band corresponding to a detected SS block.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, by using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when they are not engaging in active communications. In some cases, MTC or IoT devices may be designed to support mission critical functions. Wireless communications system 100 may be configured to provide ultra-reliable communications for these functions.

Base stations 105 may communicate with the core network 130 and with one another. For example, base stations 105 may interface with the core network 130 through backhaul links 132 (e.g., S1, S2, etc.). Base stations 105 may communicate with one another over backhaul links 134 (e.g., X1, X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 megahertz (MHz) to 2600 MHz (2.6 gigahertz (GHz)), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 25 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate the use of antenna arrays within a UE 115 (e.g., for directional beamforming). However, EHF transmissions may be subject to even greater atmospheric attenuation and shorter range than UHF transmissions.

Wireless communications system 100 may support millimeter wave (mmW) communications between UEs 115 and base stations 105. Devices operating in mmW or EHF bands may have multiple antennas to allow beamforming. For example, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, a base station 105 may have an antenna array with a number of rows and columns of antenna ports that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving SSs.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 millisecond (ms) subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexed (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Synchronization (e.g., for purposes of cell acquisition) may be performed using SSs or channels transmitted by a network entity (e.g., a base station 105). In some cases, a base station 105 may transmit SS blocks (i.e., a group of signals transmitted over a set of time and frequency resources), which may contain discovery reference signals or other SSs. For example, an SS block may include a PSS, an SSS, a PBCH, or other synchronization signals. In some examples, the signals included in an SS block may be time division multiplexed, such as a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., PSS and SSS) may be transmitted in another subset of SS block time resources. Further, in deployments that use mmW transmission frequencies, multiple SS blocks may be transmitted in different directions using beam sweeping in an SS burst, and the SS bursts may be periodically transmitted according to a SS burst set.

A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which serves to identify the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry master information block (MIB) and one or more system information blocks (SIBs) for a given cell.

For example, after receiving the MIB, a UE 115 may receive one or more SIBs which may be defined according to the type of system information conveyed. In some cases, a SIB1 may be transmitted in the fifth subframe of every eighth frame (SFN mod 8=0) and rebroadcast every other frame (20 ms). SIB1 includes access information, including cell identity information, and it may also indicate whether a UE 115 is allowed to camp on a cell. SIB1 also includes cell selection information (or cell selection parameters). Additionally, SIB1 includes scheduling information for other SIBs. SIB2 may be scheduled dynamically according to the information in SIB1, and includes access information and parameters related to common and shared channels.

After the UE 115 decodes SIB2, it may transmit a random access channel (RACH) preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance and a temporary cell radio network temporary identifier (C-RNTI). The UE 115 may then transmit an RRC connection request along with a temporary mobile subscriber identity (TMSI) (if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless communications system 100 may support the transmission of signaling that indicates an RF band associated with an SS block detected by a UE 115. For example, a base station 105 may transmit a set of SS blocks to multiple UEs 115, where the SS blocks may be frequency division multiplexed such that each SS block is transmitted on a respective RF band. A UE 115 may receive one or more of the transmitted SS blocks and determine a preferred SS block from the received SS blocks. For instance, the UE 115 may receive multiple SS blocks and determine the preferred SS block as an SS block having a highest SNR or a highest received signal power of the multiple received SS blocks. The UE 115 may in turn transmit an indication to the base station 105 that indicates the RF band of the preferred SS block. In some cases, the base station may optionally transmit a request to the UE 115 to transmit the indication of the RF band. For example, the base station 105 may include the request in broadcast information sent to the UE 115. The base station 105 may use the received information associated with the RF band of the SS block to perform efficient scheduling for subsequent communications with the UE 115.

Figure 2:
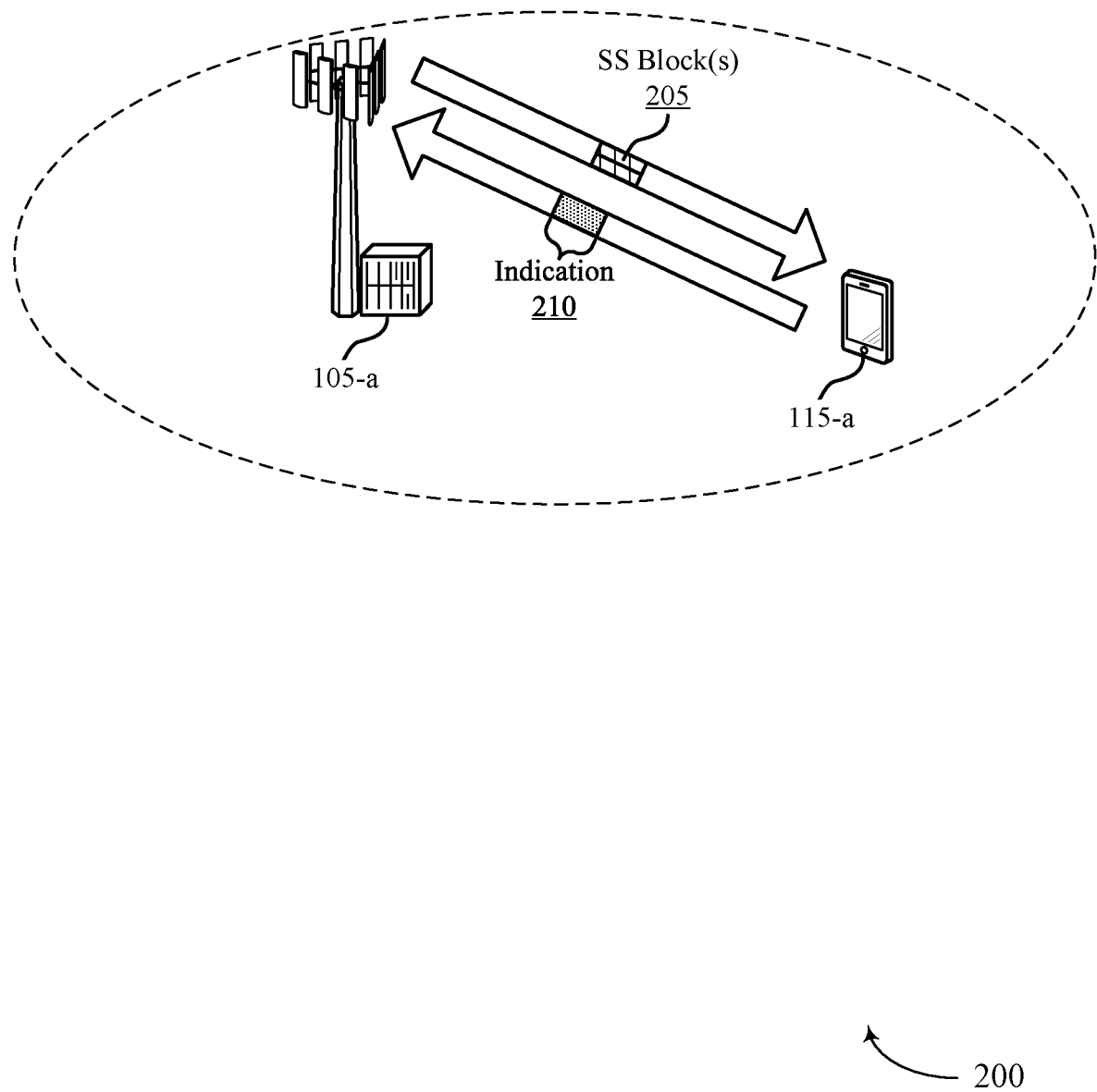
FIG. 2 illustrates an example of a wireless communications system in accordance with aspects of the present disclosure.

FIG. 2 illustrates an example of a wireless communications system 200 in accordance with various aspects of the present disclosure. In some examples, wireless communications system 200 may implement aspects of wireless communications system 100. Wireless communications system includes a UE 115-a and base station 105-a, which may be examples of the corresponding devices described with reference to FIG. 1.

Base station 105-a may be an example of a serving base station 105, and UE 115-a may listen for SSs transmitted by base station 105-a to acquire synchronization with base station 105-a for communication with a network. In such cases, base station 105-a may transmit SS sequences in the frequency domain, and UE 115-a may correlate the received SS signals with the SS sequences. In some examples, the SSs may be transmitted by base station 105-a using one or more SS blocks 205 (or using an SS burst).

Base station 105-a may transmit SS blocks 205 using a predetermined multiplexing configuration. For example, base station 105-a may transmit multiple SS blocks 205 using FDM. Using FDM to transmit SS blocks 205 may result in transmissions that are robust to certain types of interference (e.g., frequency selective fading). Additionally or alternatively, different UEs 115 (e.g., including UE 115-a) may be configured to operate in different RF bands. For instance, UE 115-a may receive SS block 205 transmissions using a first RF band and another UE 115 (not shown) may receive SS block 205 transmissions using a second, different, RF band.

After detecting one or more SS blocks 205 sent by base station 105-a, UE 115-a may transmit a random access message (e.g., a RACH message) to base station 105-a to connect to the network. However, base station 105-a may be unable to determine a frequency raster for the SS block that UE 115-a used for transmitting the random access message, which may be due to the FDM used for transmitting SS blocks 205. Additionally, when multiple SS blocks 205 are received at UE 115-a, base station 105-a may not be able to infer which SS block 205 was a preferred SS block 205 used by UE 115-a (e.g., an SS block 205 received with a highest signal strength at UE 115-a). As described herein, a frequency raster may also be referred to as an RF band, and the frequency raster may correspond to a set of locations (e.g., RF bands) where SS signals can be placed for transmission.

For instance, a frequency raster may be 500 kHz and a SS bandwidth may be, for example, 5 MHz. The SS may accordingly be placed at different locations in a system bandwidth, such as from 0-5 MHz, 0.5-5.5 MHz, 1-6 MHz, etc. RF band information may be utilized at base station 105-a for scheduling purposes, enabling base station 105-a to efficiently schedule resources on RF bands at which UE 115-a may efficiently receive signaling from base station 105-a. But in cases where the RF band information is not known by base station 105-a, subsequent communications may not be as efficient as possible.

In some cases, UE 115-a may be configured to transmit an indication 210 of the RF band (e.g., frequency location information) corresponding to the preferred SS block 205 received at UE 115-a. As described in further detail below, the indication may be triggered by a request received from base station 105-a to send the indication of the RF band information for a preferred SS block 205. Additionally or alternatively, UE 115-a may be configured to automatically transmit indication 210 to base station 105-a upon detection of SS blocks 205. For example, UE 115-a may detect more than one SS block 205, and the multiple detected SS blocks 205 may serve as a trigger for UE 115-a to transmit the indication 210 of the RF band information to base station 105-a. In such cases, UE 115-a may determine the preferred SS block 205 to signal in indication 210 based on a predetermined metric (e.g., received signal strength, SNR, signal-to-interference plus noise ratio (SINR), etc.).

Additionally or alternatively, different SS sequences or waveforms of the SS blocks 205 may trigger the transmission of indication 210. For example, a base station 105 may transmit SS blocks 205 comprising a first SS sequence and a second SS sequence to UE 115-a. Receiving the first SS sequence may indicate, to UE 115-a, a request to transmit an indication of the RF band, while receiving the second SS sequence may indicate that the base station 105 did not request the RF band information. In some cases, the first SS sequence and the second SS sequence may be shifts of each other (e.g., shifts in time, cyclic shifts, etc.).

UE 115-a may transmit indication 210 to base station 105-a using signaling in a random access message, such as a RACH message 3. In some cases, UE 115-a may transmit indication 210 to base station 105-a using various other signaling techniques. For example, indication 210 may be represented by a coded number of bits (e.g., 3 bits), or may be inferred through the timing of a RACH message. Indication 210 may also be sent using other signaling techniques. In some cases, indication 210 may include an index of the RF band corresponding to a received SS block 205. Additionally or alternatively, UE 115-a may signal, within indication 210, a physical resource block (PRB) corresponding to the preferred SS block 205.

In some cases, UE 115-a may provide an indication of frequency location information for one or more SS blocks 205 (or SS bursts) received by UE 115-a that are used for measurements. For instance, an SS block 205 may be configured for channel state information reference signal (CSI-RS)-based radio resource management (RRM) measurements (e.g., channel quality indication (CQI), reference signal received power (RSRP), reference signal received quality (RSRQ), received signal strength indication (RSSI), etc.), and frequency information for the associated SS block 205 may be provided to base station 105-a. Additionally or alternatively, an indication of the frequency information may be provided for an SS block 205 that is located outside of a SS raster (e.g., for SSBs transmitted/received on a primary serving cell (PSCell) not on the raster).

In some examples, a timing associated with the transmission of a random access message is sent by UE 115-a may indicate a respective RF band for a preferred SS block 205 received at UE 115-a. For example, UE 115-a may transmit a RACH message 3 during a first time period, and base station 105-a may determine that an SS block 205 was received by UE 115-a in a first RF band based on the timing of the transmitted RACH message 3, whereas another RACH message transmitted during a second time period may indicate another SS block 205 was received on a second RF band.

UE 115-a may be configured to operate in different feedback modes for signaling RF bands for SS blocks. For example, UE 115-a may have a first feedback mode and a second feedback mode. In the first feedback mode (e.g., a default mode), UE 115-a may be configured not to send indication 210 to base station 105-a upon detection of SS blocks 205. In the second feedback mode, UE 115-a may be configured to send indication 210 to base station 105-a upon detection of SS blocks 205. In some examples, base station 105-a may transmit a signal to UE 115-a, requesting UE 115-a to switch modes (i.e., to turn on or turn off an RF band indication).

As mentioned above, base station 105-a may transmit a request to UE 115-a to report the indication of the respective RF bands of received SS blocks 205. For example, base station 105-a may send signaling requesting that UE 115-a report a RF band of received SS blocks 205 after base station 105-a transmits the SS blocks 205. In other cases, base station 105-a may request that UE 115-a report RF band information at the same time that the SS blocks 205 are transmitted (e.g., the request may be transmitted along with the SS blocks 205). Additionally or alternatively, base station 105-a may send signaling indicating to UE 115-a to start or stop sending indication 210 of the RF bands. Base station 105-a may transmit the request using a predetermined downlink channel (e.g., using PBCH). For example, the request for RF band information may be indicated by a number of bits in the PBCH (e.g., one bit in the PBCH).

In some cases, base station 105-a may also send transmission configuration information to UE 115-a using the request for the respective RF bands. For example, in addition to a signal requesting that UE 115-a report the RF band of received SS blocks 205, the request may also include an indication of signaling parameters that UE 115-a may use for transmitting indication 210. In such cases, base station 105-a may specify a format, resources, timing information, and the like, for transmitting indication 210. In other cases, base station 105-a may send an indication of signaling parameters separate from other transmissions.

Base station 105-a may use the indication of the RF band to assist in scheduling, where, upon receiving indication 210 from UE 115-a, base station 105-a may determine to schedule resources for communication with UE 115-a based on information included in indication 210. For example, base station 105-a may use information contained in indication 210 to determine whether to schedule subsequent communications with UE 115-a by using a RF band corresponding to a preferred SS block 205. Using indication 210 may allow base station 105-a to perform efficient scheduling of resources to communicate with UE 115-a.

Figure 3:
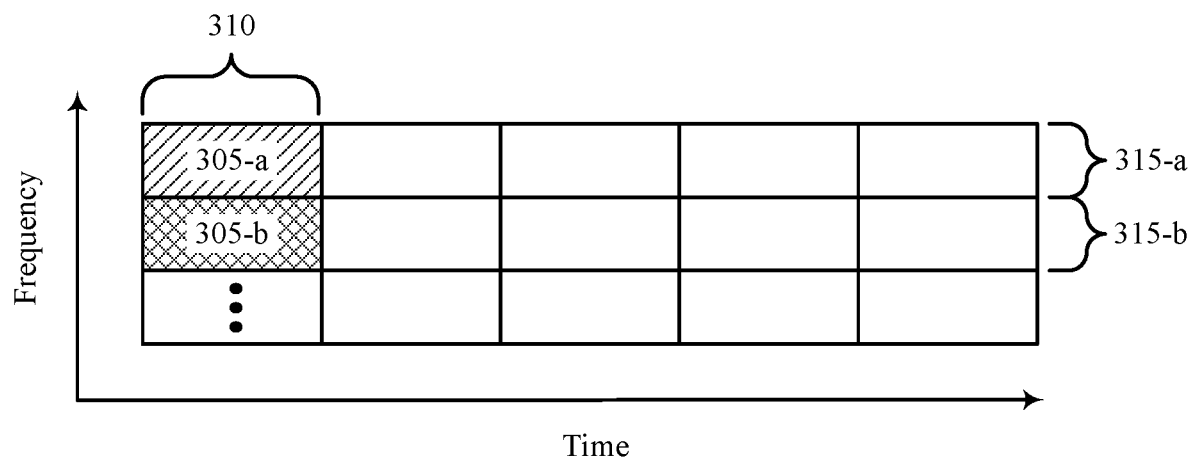
FIG. 3 illustrates an example of a synchronization signal (SS) block transmission in accordance with aspects of the present disclosure.

FIG. 3 illustrates an example of an SS block transmission 300 in accordance with various aspects of the present disclosure. In some examples, SS block transmission 300 may implement aspects of wireless communications system 100. SS block transmission may be an example of SS blocks multiplexed using FDM, and transmitted by a base station 105 to one or more UEs 115. The UEs 115 receiving SS block transmission 300 may indicate a respective RF band associated with one or more received SS blocks.

For example, SS block transmission 300 may include one or more SS blocks 305 transmitted by a base station 105 during symbol periods 310. In the case of frequency division multiplexed SS blocks, the SS blocks may each be transmitted in a respective RF band 315 during the same symbol period 310. For example, a first SS block 305-*a* may be transmitted in a first RF band 315-*a*, where a second SS block 305-*b* may be transmitted in a second RF band 315-*b*. In some cases, RF bands 315 may be different RF bands of a CC or may be representative of one or more CCs in a system bandwidth. In one example, multiple SS blocks may be transmitted in a single CC, where the multiple SS blocks may be transmitted in different bandwidth portions within the same CC.

A UE 115, may use the SS blocks 305 transmitted in symbol period 310 to acquire synchronization with the base station 105. In such cases, the UE 115 may receive one or more SS blocks 305 sent by the base station 105, and may further use the one or more SS blocks 305 for transmitting a random access message, for example, when the UE 115 is attempting to establish an RRC connection (e.g., from an RRC_IDLE mode). As described above, to improve communications efficiency, the UE 115 may transmit additional signaling that indicates the respective RF band 315 that corresponds to the one or more SS blocks 305 received at the UE 115.

For example, the UE 115 may receive first SS block 305-*a* and may indicate first RF band 315-*a* for first SS block 305-*a*. In such cases, first SS block 305-*a* may be determined to be a preferred SS block 305-*a*, which may correspond to the SS block 305 that has a highest signal strength that the UE 115 may utilize for transmitting a subsequent random access message. In another example, the UE 115 may receive both first SS block 305-*a* and second SS block 305-*b*. In such cases, the UE 115 may determine which SS block 305 has a higher signal strength (e.g., a received signal power or highest SNR). Accordingly, the SS block with the highest signal strength may be determined to be the preferred SS block (first SS block 305-*a* in this example, but any other SS block 305 out of the multiple received SS blocks 305 may have a higher signal strength), and the UE 115 may indicate RF band 315-*a* (that corresponds to first SS block 305-*a*) to the base station 105.

Figure 4:
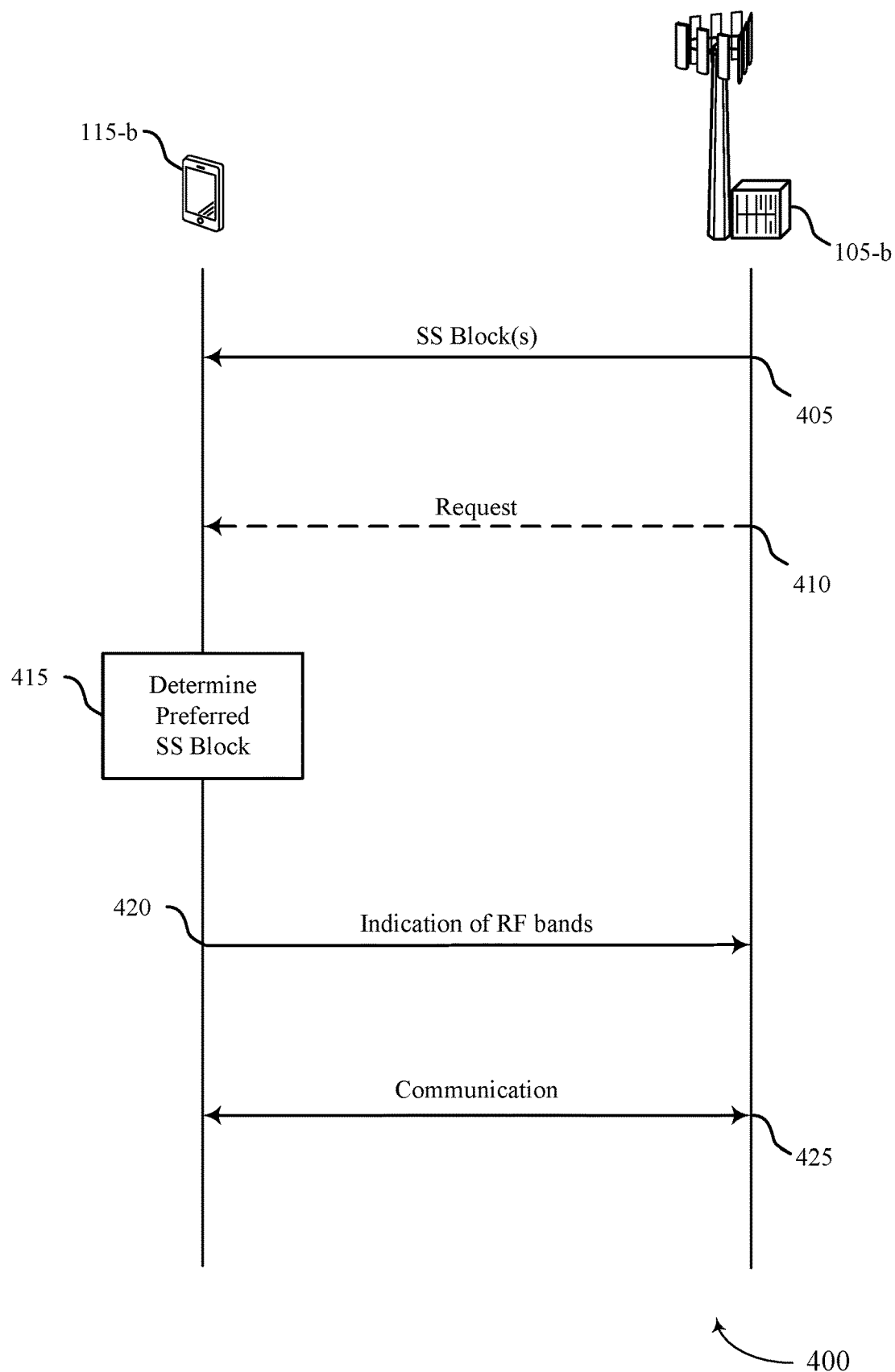
FIG. 4 illustrates an example of a process flow in accordance with aspects of the present disclosure.

FIG. 4 illustrates an example of a process flow 400 in accordance with various aspects of the present disclosure. In some examples, process flow 400 may implement aspects of wireless communications system 100. For example, process flow 400 includes UE 115-*b* and base station 105-*b*, which may be examples of the corresponding devices described with reference to FIGS. 1 and 2. Process flow 400 may illustrate an example of signaling sent to base station 105-*b* that indicates an RF band of an SS block detected by UE 115-*b*.

At 405, base station 105-*b* may transmit multiple SS blocks to one or more UEs 115 (e.g., including UE 115-*b*). In some examples, the multiple SS blocks may be transmitted to UE 115-*b* using a FDM configuration, as described above. For example, base station 105-*b* may transmit, and UE 115-*b* may receive, one or more SS blocks, where each of the one or more SS blocks is transmitted at a respective RF band.

At 410, base station 105-*b* may optionally transmit signaling that indicates a request to UE 115-*b* to signal the respective RF band for one or more SS blocks received by UE 115-*b*. In some cases, the signaling including the request may be transmitted at the same time as the SS blocks sent at 405. In other cases, the request may be sent before or after the transmission of the SS blocks at 405. In some examples, the signaling of the request sent by base station 105-*b* may be transmitted using a predetermined downlink channel (e.g., using PBCH) and indicated by a number of bits (e.g., one bit). In some cases, base station 105-*b* may send signaling parameters to UE 115-*b* along with the signaling that indicates the request. In such cases, base station 105-*b* may determine the signaling parameters that may include a format, resources, or timing for transmitting an indication of a RF band for a detected SS block.

UE 115-*b* may receive the one or more SS blocks transmitted at 405 by base station 105-*b* and, at 415, determine a preferred SS block of the received one or more SS blocks based on a signal strength of the one or more SS blocks. For example, UE 115-*b* may receive or detect multiple SS blocks and use a predetermined metric (e.g., a highest received signal strength, SNR, etc.) to determine which SS block is the preferred SS block (e.g., the SS block that UE 115-*b* may base a random access request on).

At 420, UE 115-*b* may transmit a signal to base station 105-*b* that includes an indication of the RF band (a frequency raster) of the preferred SS block. In some examples, UE 115-*b* may transmit the indication in accordance with the identified signaling parameters. UE 115-*b* may use various signaling techniques to indicate the RF band of the detected SS blocks. In one example, UE 115-*b* may transmit a signal to base station 105-*b* indicating the index of an RF band corresponding to the preferred SS block. In another example, UE 115-*b* may determine a timing to transmit signaling responsive to receipt of the one or more SS blocks, where the timing is indicative of the respective RF band. Accordingly, UE 115-*b* may transmit the signaling in accordance with the determined timing. In yet another example, UE 115-*b* may transmit a signal to base station 105-*b* indicating a PRB corresponding to a preferred SS block. In some cases, the signal sent by UE 115-*b* at 420 may be transmitted using a random access message (e.g., using RACH message 3).

In some cases, UE 115-*b* may detect multiple SS blocks and may automatically generate and transmit an indication of a respective RF band to base station 105-*b*. For example, base station 105-*b* may not transmit the optional request for signaling of the RF band to UE 115-*b* at 410. However, upon detection of multiple SS blocks, UE 115-*b* may be configured to signal an indication of respective RF bands of detected SS blocks without receiving explicit signaling from base station 105-*b* to do so. Additionally or alternatively, UE 115-*b* may determine to indicate the respective RF band on an SS sequence of the received one or more SS blocks.

At 425, base station 105-*b* and UE 115-*b* may communicate with each other based on the indicated RF band of the preferred SS block. For example, upon receiving the indication of the RF band, base station 105-*b* may determine to schedule resources used to communicate UE 115-*b* based on the indicated RF band (e.g., using the RF band that corresponds to a preferred SS block).

Figure 5:
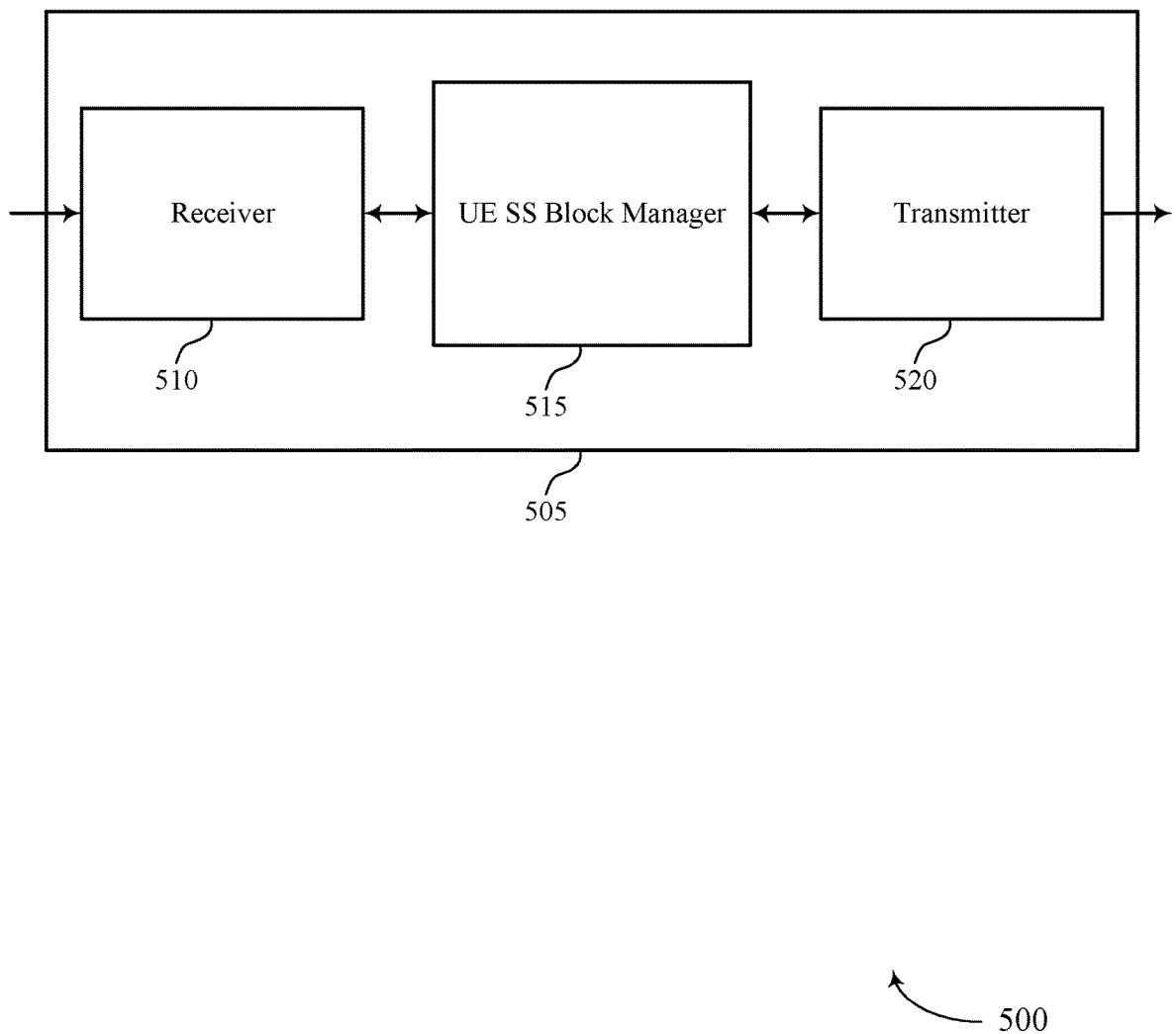
FIGS. 5 through 7 show block diagrams of a device in accordance with aspects of the present disclosure.

FIG. 5 shows a block diagram 500 of a wireless device 505 in accordance with aspects of the present disclosure. Wireless device 505 may be an example of aspects of a UE 115 as described herein. Wireless device 505 may include receiver 510, UE SS block manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to signaling for detected synchronization signal blocks, etc.). Information may be passed on to other components of the device. The receiver 510 may be an example of aspects of the transceiver 835 described with reference to FIG. 8. The receiver 510 may utilize a single antenna or a set of antennas.

UE SS block manager 515 may be an example of aspects of UE SS block manager 815 described with reference to FIG. 8. UE SS block manager 515 and/or at least some of its various sub-components may be implemented in hardware, software executed by a processor, firmware, or any combination thereof. If implemented in software executed by a processor, the functions of UE SS block manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

UE SS block manager 515 and/or at least some of its various sub-components may be physically located at various positions, including being distributed such that portions of functions are implemented at different physical locations by one or more physical devices. In some examples, UE SS block manager 515 and/or at least some of its various sub-components may be a separate and distinct component in accordance with various aspects of the present disclosure. In other examples, UE SS block manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE SS block manager 515 may receive, at a set of RF bands, one or more SS blocks from a base station 105. Each of the one or more SS blocks may be received at a respective RF band. UE SS block manager 515 may determine a preferred SS block of the received one or more SS blocks based on a signal strength of the one or more SS blocks, and indicate to the base station 105 the respective RF band of the preferred SS block.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
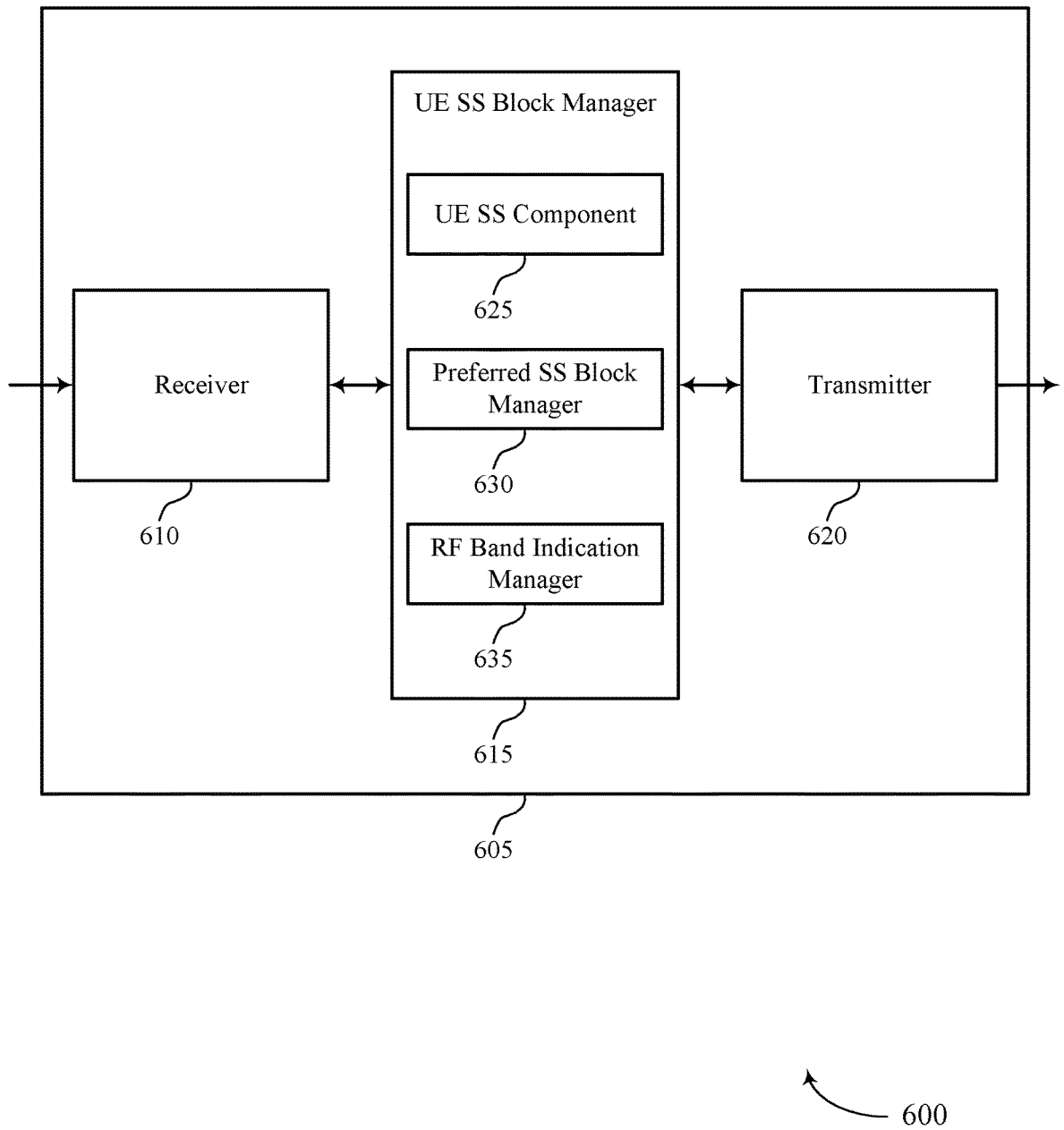

FIG. 6 shows a block diagram 600 of a wireless device 605 in accordance with aspects of the present disclosure. Wireless device 605 may be an example of aspects of a wireless device 505 or a UE 115 as described with reference to FIG. 5. Wireless device 605 may include receiver 610, UE SS block manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RF band signaling for detected synchronization signal blocks, etc.). Information may be passed on to other components of the device. The receiver 610 may be an example of aspects of the transceiver 835 described with reference to FIG. 8. The receiver 610 may utilize a single antenna or a set of antennas.

UE SS block manager 615 may be an example of aspects of the UE SS block manager 815 described with reference to FIG. 8. UE SS block manager 615 may also include UE SS component 625, preferred SS block manager 630, and RF band indication manager 635.

UE SS component 625 may receive, at a set of RF bands, one or more SS blocks from a base station 105. Each of the one or more SS blocks may be received at a respective RF band. Preferred SS block manager 630 may determine a preferred SS block of the received one or more SS blocks based on a signal strength of the one or more SS blocks and determine the preferred SS block as an SS block having a highest SNR of the determined SNRs or as an SS block having a highest received signal power of the determined received signal powers.

RF band indication manager 635 may indicate to the base station 105 the respective RF band of the preferred SS block and transmit the indication based on a received request. In some examples, RF band indication manager 635 may transmit the indication in accordance with identified signaling parameters. In some cases, RF band indication manager 635 may determine to indicate the respective RF band based on receiving two or more SS blocks.

In some cases, indicating the respective RF band may include determining a timing to transmit a signaling responsive to receipt of the one or more SS blocks, where the timing is indicative of the respective RF band. In such cases, RF band indication manager 635 may transmit the signaling in accordance with the determined timing. In some cases, indicating the respective RF band may include transmitting, via a RACH message, an index of the respective RF band. Additionally or alternatively, indicating the respective RF band may include transmitting an indication of a PRB corresponding to a preferred SS block.

Transmitter 620 may transmit signals generated by other components of the device. In some examples, transmitter 620 may be collocated with a receiver 610 in a transceiver module. For example, the transmitter 620 may be an example of aspects of the transceiver 835 described with reference to FIG. 8. Transmitter 620 may utilize a single antenna or a set of antennas.

Figure 7:
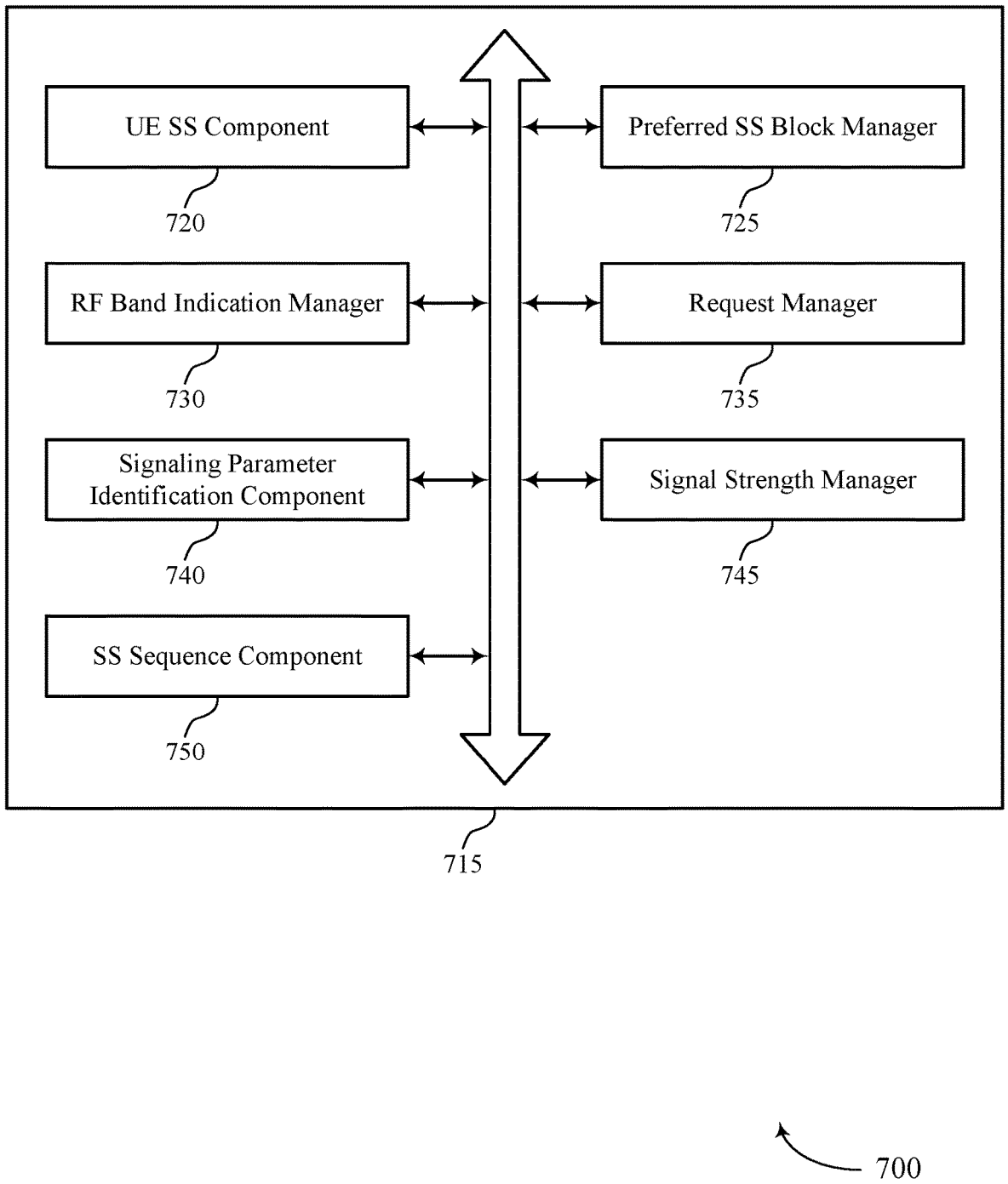

FIG. 7 shows a block diagram 700 of UE SS block manager 715 in accordance with aspects of the present disclosure. UE SS block manager 715 may be an example of aspects of UE SS block manager 515, UE SS block manager 615, or UE SS block manager 815 described with reference to FIGS. 5, 6, and 8. UE SS block manager 715 may include UE SS component 720, preferred SS block manager 725, RF band indication manager 730, request manager 735, signaling parameter identification component 740, signal strength manager 745, and SS sequence component 750. Each of these modules may communicate, directly or indirectly, with one another (e.g., via one or more buses).

UE SS component 720 may receive, at a set of radio frequency (RF) bands, one or more synchronization signal (SS) blocks from base station 105, each of the one or more SS blocks being received at a respective RF band.

Preferred SS block manager 725 may determine a preferred SS block of the received one or more SS blocks based on a signal strength of the one or more SS blocks and determine the preferred SS block as an SS block having the highest SNR of the determined SNRs or as an SS block having the highest received signal power of the determined received signal powers.

RF band indication manager 730 may indicate to the base station 105 the respective RF band of the preferred SS block and transmit the indication based on a received request. In some examples, RF band indication manager 730 may transmit the indication in accordance with the identified signaling parameters. In some cases, RF band indication manager 730 may determine to indicate the respective RF band based on receiving two or more SS blocks.

In some cases, indicating the respective RF band may include determining a timing to transmit signaling responsive to receipt of the one or more SS blocks, where the timing is indicative of the respective RF band. In such cases, RF band indication manager 730 may transmit the signaling in accordance with the determined timing. In some cases, indicating the respective RF band may include transmitting, via a RACH message, an index of the respective RF band. Additionally or alternatively, indicating the respective RF band may include transmitting an indication of a PRB corresponding to a preferred SS block.

Request manager 735 may receive a request from the base station 105 to transmit an indication of the respective RF band. In some cases, the request is received via a PBCH. Signaling parameter identification component 740 may identify, within the request, signaling parameters including one or more of a format, resources, or timing for transmitting the indication. Signal strength manager 745 may determine an SNR or a received signal power associated with each of the received one or more SS blocks. SS sequence component 750 may determine to indicate the respective RF band based on an SS sequence of the received one or more SS blocks.

Figure 8:
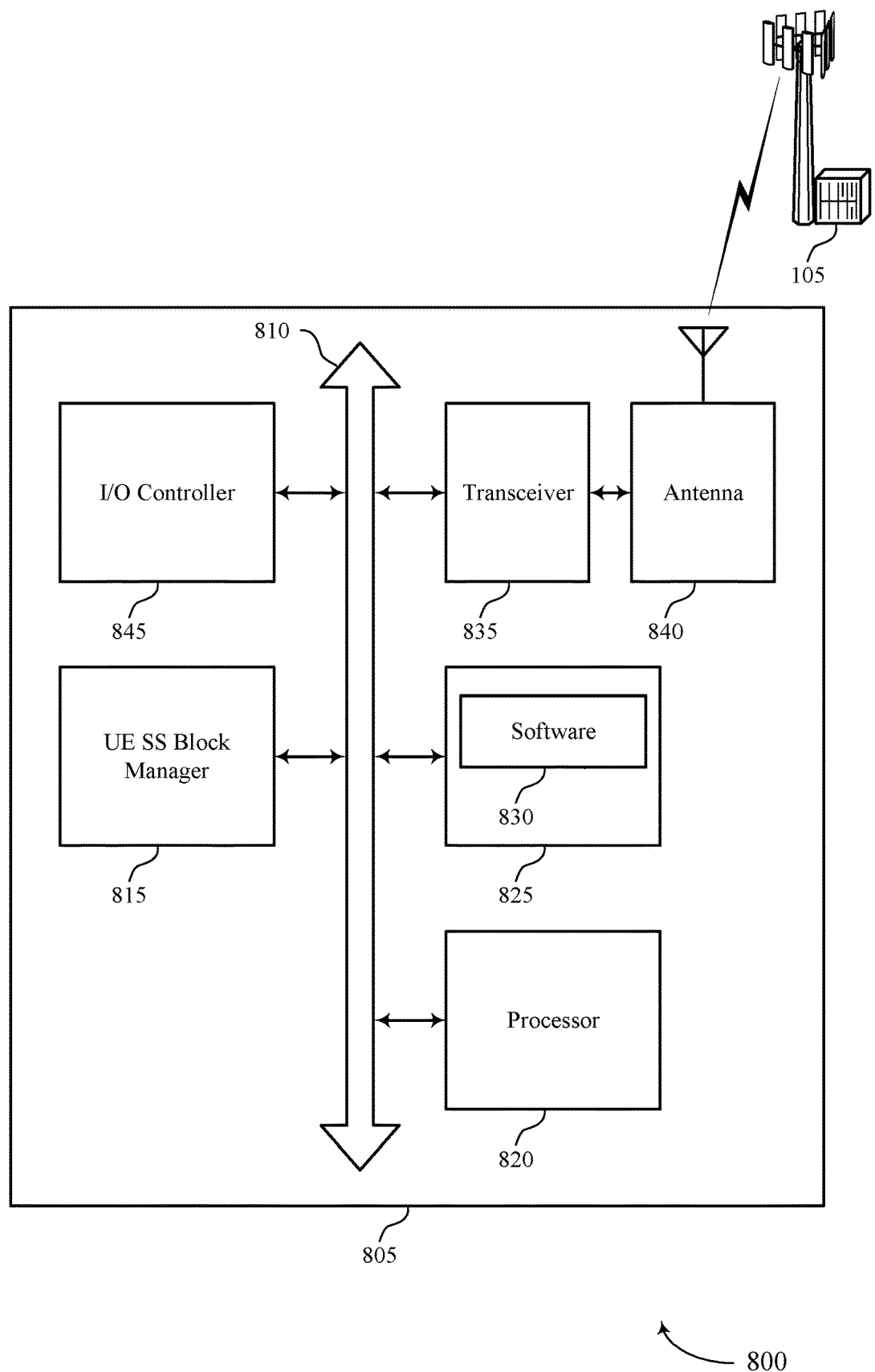
FIG. 8 illustrates a block diagram of a system including a user equipment (UE) in accordance with aspects of the present disclosure.

FIG. 8 shows a diagram of a system 800 including a device 805 in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE SS block manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting RF band signaling for detected synchronization signal blocks).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support signaling for detected synchronization signal blocks. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas. In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
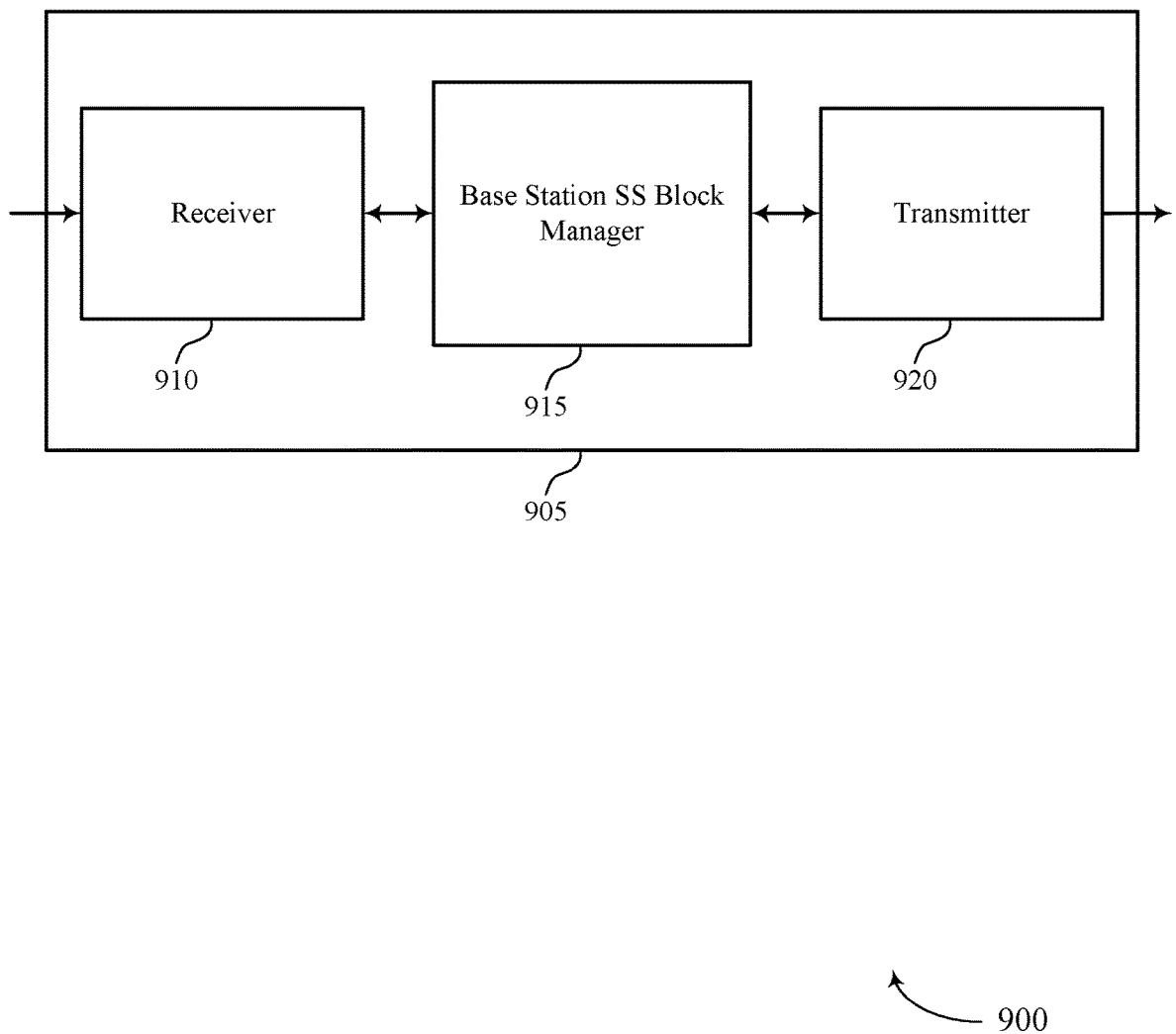
FIGS. 9 through 11 show block diagrams of a device in accordance with aspects of the present disclosure.

FIG. 9 shows a block diagram 900 of a wireless device 905 in accordance with aspects of the present disclosure. Wireless device 905 may be an example of aspects of a base station 105 as described herein. Wireless device 905 may include receiver 910, base station SS block manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to signaling for detected synchronization signal blocks, etc.). Information may be passed on to other components of the device. The receiver 910 may be an example of aspects of the transceiver 1235 described with reference to FIG. 12. The receiver 910 may utilize a single antenna or a set of antennas.

Base station SS block manager 915 may be an example of aspects of the base station SS block manager 1215 described with reference to FIG. 12. Base station SS block manager 915 and/or at least some of its various sub-components may be implemented in hardware, software executed by a processor, firmware, or any combination thereof. If implemented in software executed by a processor, the functions of the base station SS block manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station SS block manager 915 and/or at least some of its various sub-components may be physically located at various positions, including being distributed such that portions of functions are implemented at different physical locations by one or more physical devices. In some examples, base station SS block manager 915 and/or at least some of its various sub-components may be a separate and distinct component in accordance with various aspects of the present disclosure. In other examples, base station SS block manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station SS block manager 915 may transmit one or more SS blocks, each of the one or more SS blocks being transmitted at a respective RF band and receive, from a UE 115, an indication of the respective RF band of at least one SS block of the transmitted one or more SS blocks received by the UE 115.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
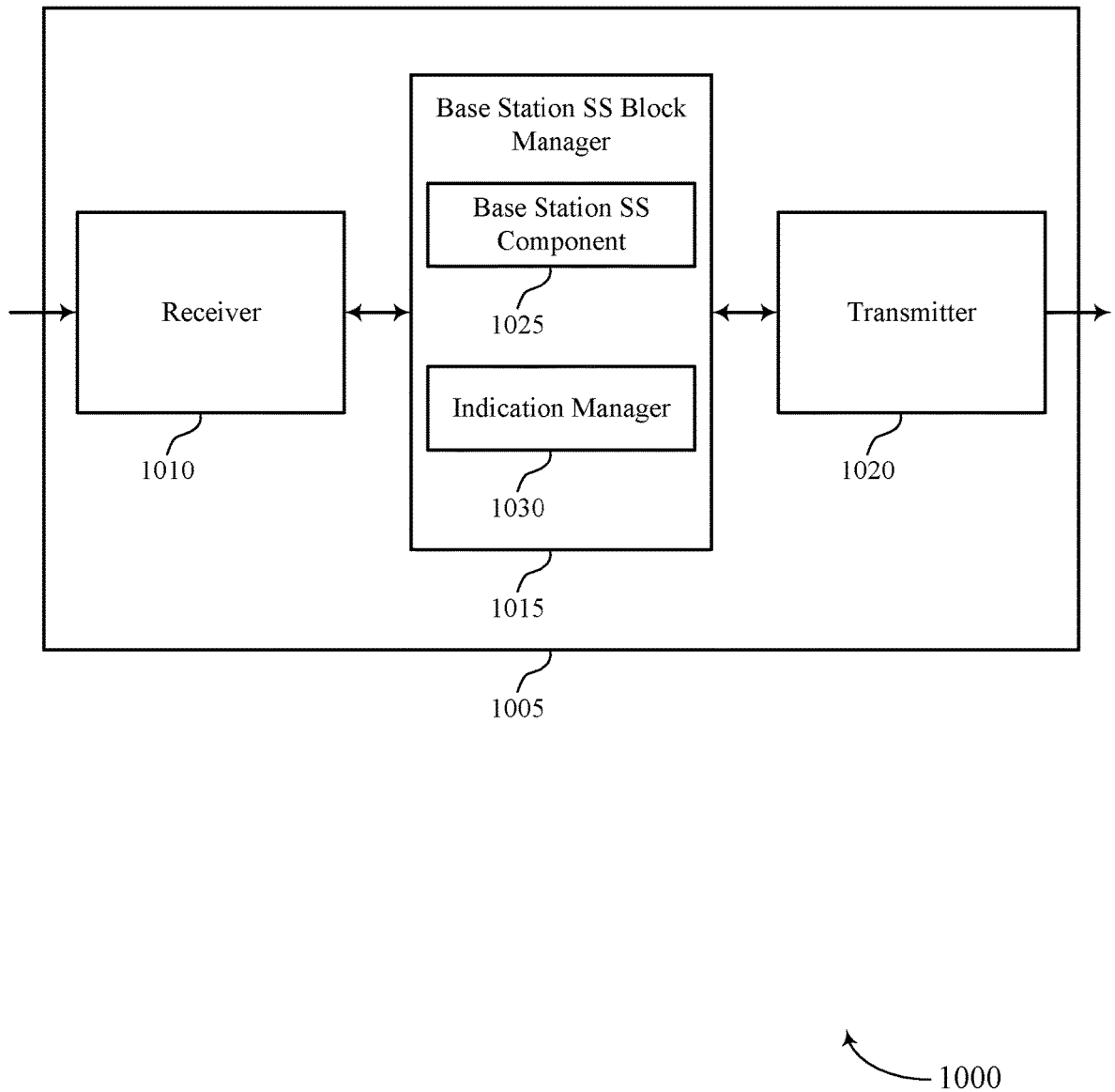

FIG. 10 shows a block diagram 1000 of a wireless device 1005 in accordance with aspects of the present disclosure. Wireless device 1005 may be an example of aspects of a wireless device 905 or a base station 105 as described with reference to FIG. 9. Wireless device 1005 may include receiver 1010, base station SS block manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to signaling for detected synchronization signal blocks, etc.). Information may be passed on to other components of the device. The receiver 1010 may be an example of aspects of the transceiver 1235 described with reference to FIG. 12. The receiver 1010 may utilize a single antenna or a set of antennas.

Base station SS block manager 1015 may be an example of aspects of the base station SS block manager 1215 described with reference to FIG. 12. Base station SS block manager 1015 may also include base station SS component 1025 and indication manager 1030.

Base station SS component 1025 may transmit one or more SS blocks, each of the one or more SS blocks being transmitted at a respective RF band. In some cases, the at least one SS block is a preferred SS block of the one or more SS blocks received by a UE 115, the preferred SS block having a highest SNR or a highest received signal power of the transmitted one or more SS blocks.

Indication manager 1030 may receive, from the UE 115, an indication of the respective RF band of at least one SS block of the transmitted one or more SS blocks received by the UE. In some cases, indication manager 1030 may receive the indication based on a transmitted request. In some cases, transmitting the request may include transmitting signaling parameters within the request to the one or more UEs 115. In some cases, receiving the indication of the respective RF band includes receiving, via a RACH message, an index of the respective RF band. Additionally or alternatively, receiving the indication of the respective RF band may include receiving an indication of a PRB corresponding to the at least one SS block.

Transmitter 1020 may transmit signals generated by other components of the device. In some cases, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
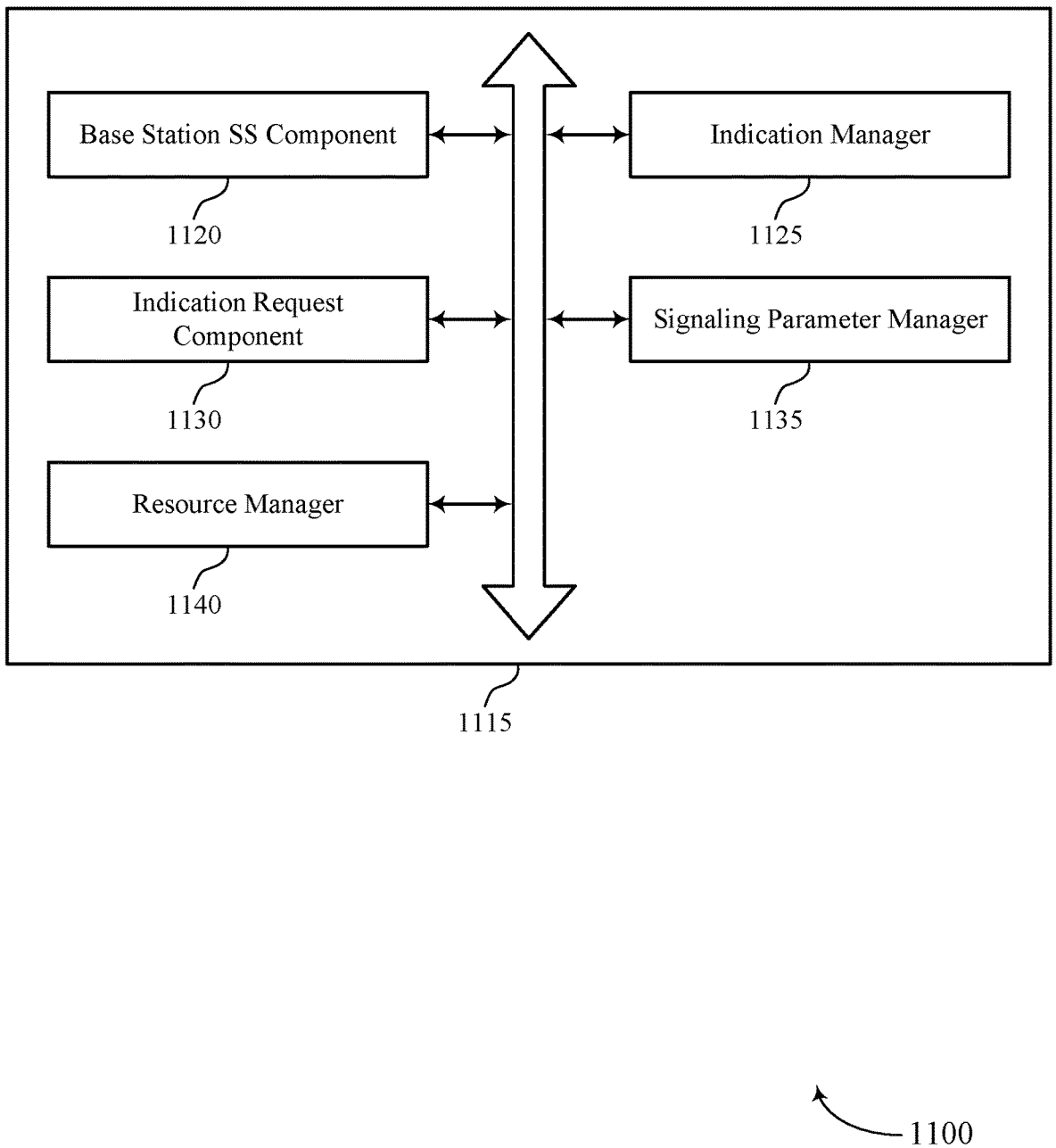

FIG. 11 shows a block diagram 1100 of a base station SS block manager 1115 in accordance with aspects of the present disclosure. The base station SS block manager 1115 may be an example of aspects of a base station SS block manager 1215 described with reference to FIGS. 9, 10, and 12. The base station SS block manager 1115 may include base station SS component 1120, indication manager 1125, indication request component 1130, signaling parameter manager 1135, and resource manager 1140. Each of these modules may communicate, directly or indirectly, with one another (e.g., via one or more buses).

Base station SS component 1120 may transmit one or more SS blocks, each of the one or more SS blocks being transmitted at a respective RF band. In some cases, the at least one SS block is a preferred SS block of the one or more SS blocks received by the UE, the preferred SS block having a highest SNR or a highest received signal power of the transmitted one or more SS blocks.

Indication manager 1125 may receive, from the UE 115, an indication of the respective RF band of at least one SS block of the transmitted one or more SS blocks received by the UE. In some cases, indication manager 1125 may receive the indication based on a transmitted request. In some cases, transmitting the request may include transmitting signaling parameters within the request to the one or more UEs 115. In some cases, receiving the indication of the respective RF band includes receiving, via a RACH message, an index of the respective RF band. Additionally or alternatively, receiving the indication of the respective RF band may include receiving an indication of a PRB corresponding to the at least one SS block.

Indication request component 1130 may transmit a request to one or more UEs to signal the indication of the respective RF band. In some cases, the request is transmitted via a PBCH. Signaling parameter manager 1135 may determine signaling parameters including one or more of a format, resources, or timing for transmitting the indication. Resource manager 1140 may schedule resources for communication with the UE 115 based on the received indication of the respective RF band.

Figure 12:
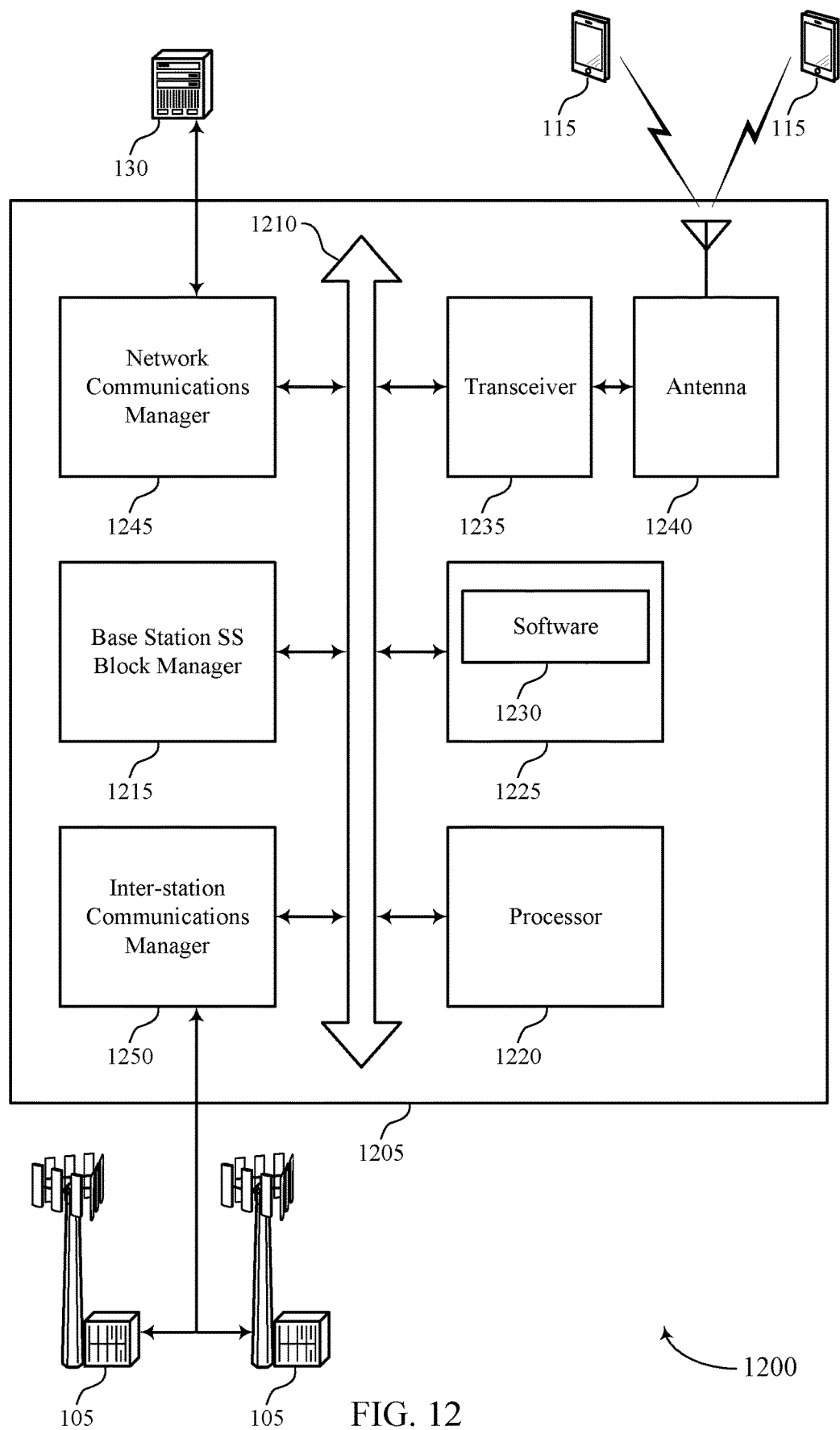
FIG. 12 illustrates a block diagram of a system including a base station in accordance with aspects of the present disclosure.

FIG. 12 shows a diagram of a system 1200 including a device 1205 in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station SS block manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting RF band signaling for detected synchronization signal blocks).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support signaling for detected synchronization signal blocks. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an X2 interface within an Long Term Evolution (LTE)/LTE-A wireless communication network technology to provide communication between base stations 105.

Figure 13:
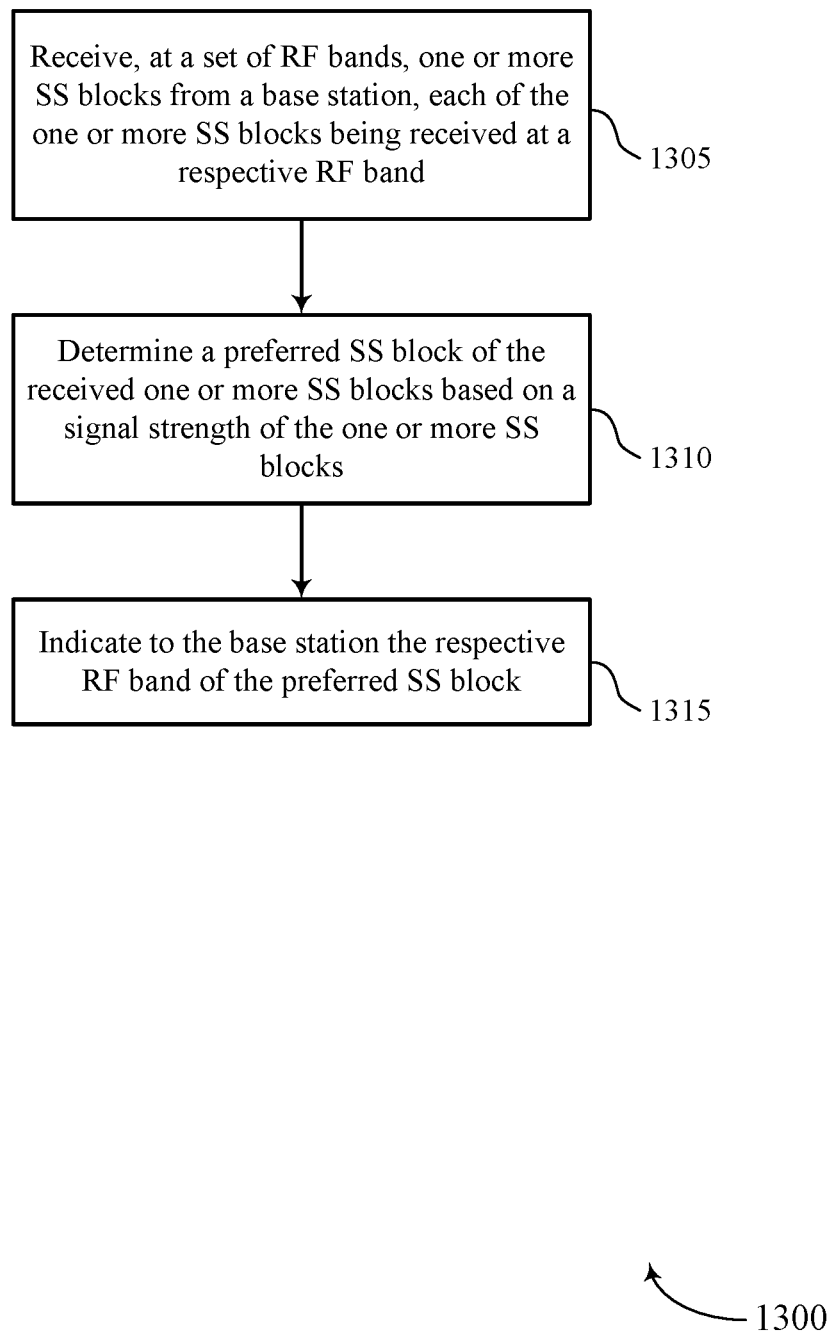
FIGS. 13 through 18 illustrate methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a UE SS block manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, at a plurality of RF bands, one or more SS blocks from a base station 105, each of the one or more SS blocks being received at a respective RF band. The operations of 1305 may be performed according to the methods described herein. In some examples, aspects of the operations of 1305 may be performed by a UE SS component as described with reference to FIGS. 5 through 8.

At 1310 the UE 115 may determine a preferred SS block of the received one or more SS blocks based at least in part on a signal strength of the one or more SS blocks. The operations of 1310 may be performed according to the methods described herein. In some examples, aspects of the operations of 1310 may be performed by a preferred SS block manager as described with reference to FIGS. 5 through 8.

At 1315 the UE 115 may indicate to the base station 105 the respective RF band of the preferred SS block. For example, the UE 115 may transmit signaling to the base station 105 that indicates a RF band of a detected SS block. The operations of 1315 may be performed according to the methods described herein. In some examples, aspects of the operations of 1315 may be performed by a RF band indication manager as described with reference to FIGS. 5 through 8.

Figure 14:
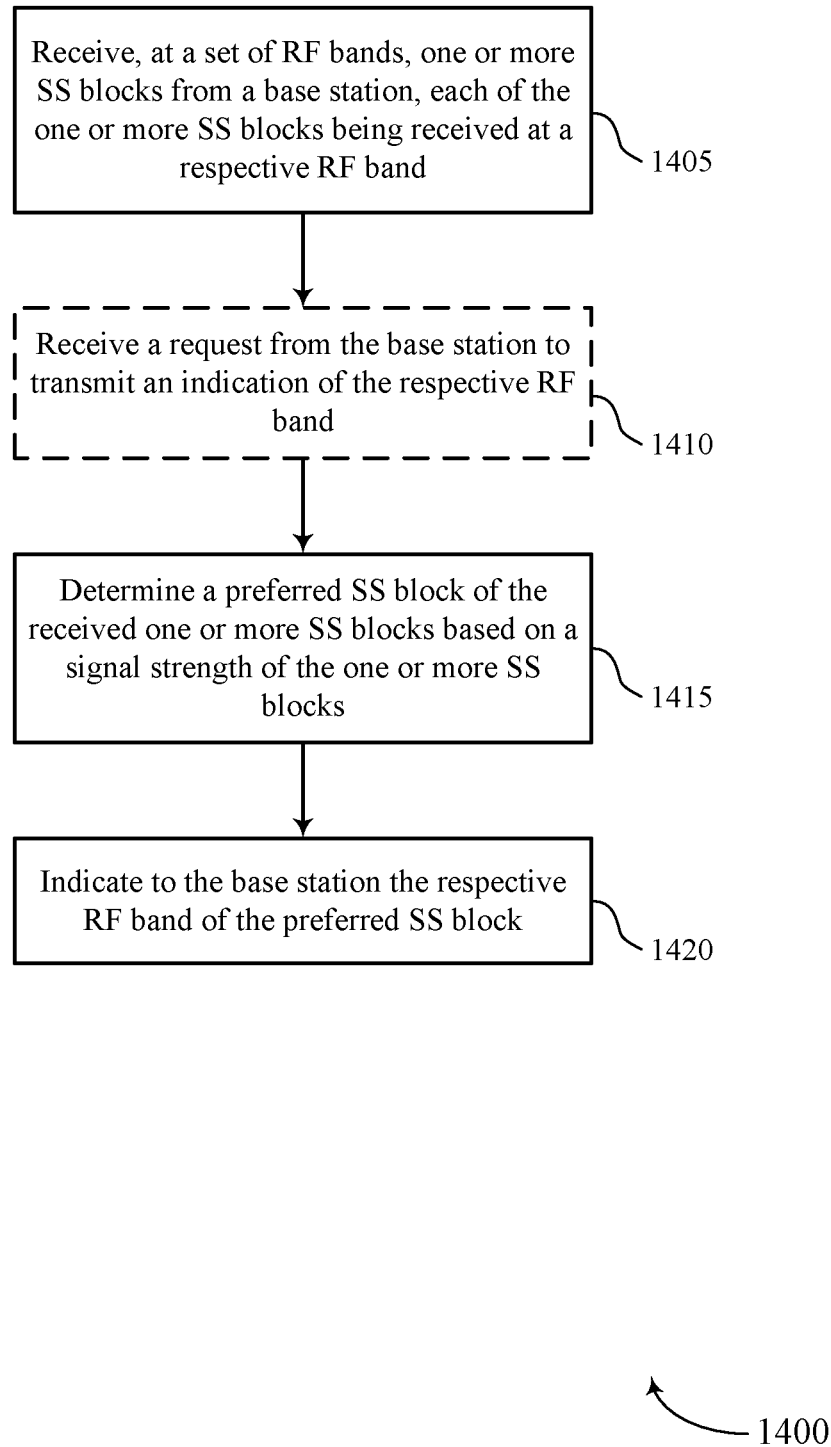

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE SS block manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, at a plurality of RF bands, one or more SS blocks from a base station 105. Each of the one or more SS blocks may be received at a respective RF band. The operations of 1405 may be performed according to the methods described herein. In some examples, aspects of the operations of 1405 may be performed by a UE SS component as described with reference to FIGS. 5 through 8.

At 1410 the UE 115 may optionally receive a request from the base station 105 to transmit an indication of the respective RF band. The operations of 1410 may be performed according to the methods described herein. In some examples, aspects of the operations of 1410 may be performed by a request manager as described with reference to FIGS. 5 through 8.

At 1415 the UE 115 may determine a preferred SS block of the received one or more SS blocks based at least in part on a signal strength of the one or more SS blocks. The operations of 1415 may be performed according to the methods described herein. In some examples, aspects of the operations of 1415 may be performed by a preferred SS block manager as described with reference to FIGS. 5 through 8.

At 1420 the UE 115 may indicate to the base station 105 the respective RF band of the preferred SS block. In such cases, the UE 115 may transmit the indication based on the received request. The operations of 1420 may be performed according to the methods described herein. In some examples, aspects of the operations of 1420 may be performed by a RF band indication manager as described with reference to FIGS. 5 through 8.

Figure 15:
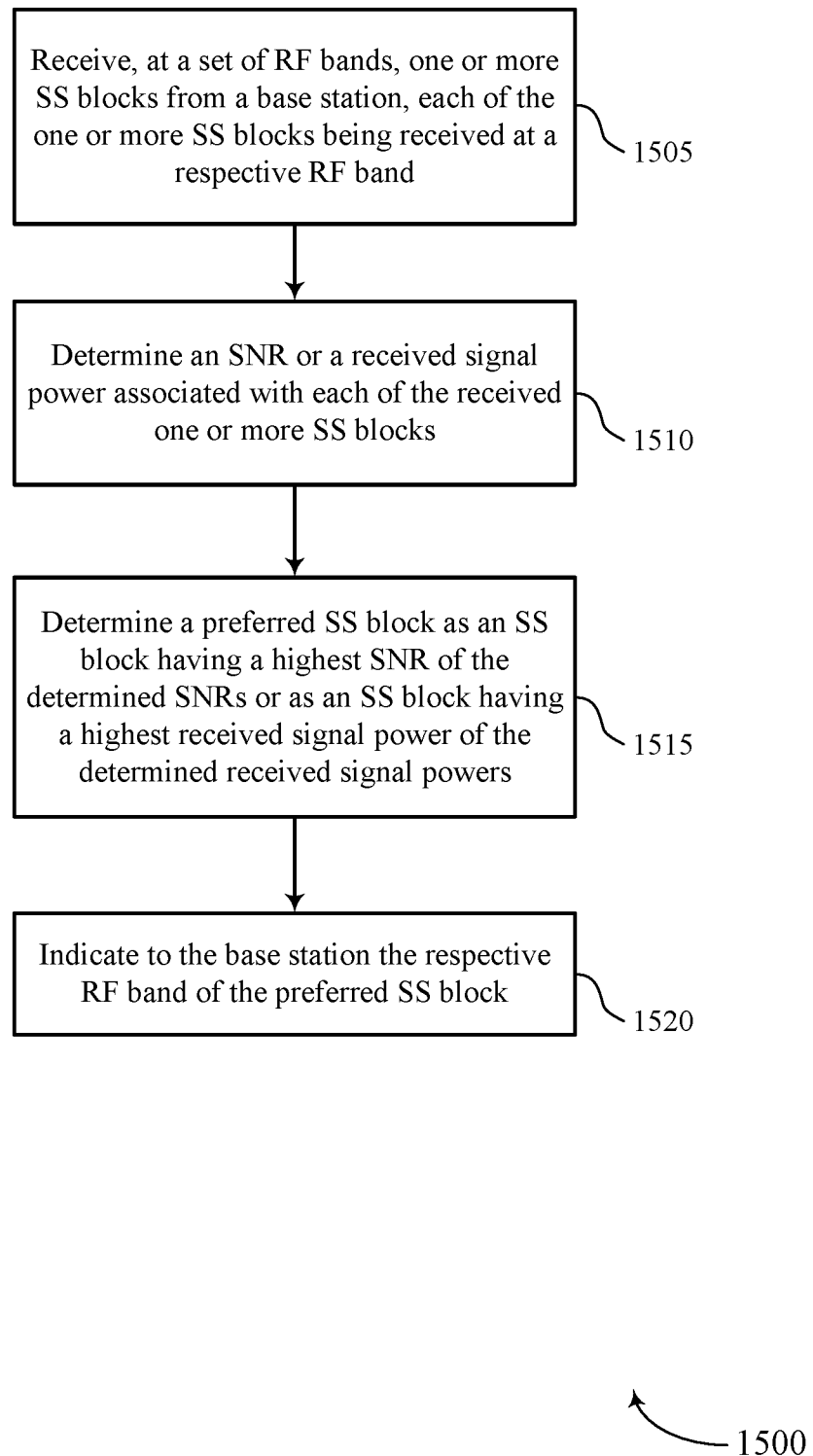

FIG. 15 shows a flowchart illustrating a method 1500 in accordance with aspects of the present disclosure. The operations of method 1500 may be implemented by a UE 115 or its components as described herein. For example, the operations of method 1500 may be performed by a UE SS block manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive, at a plurality of RF bands, one or more SS blocks from a base station, each of the one or more SS blocks being received at a respective RF band. The operations of 1505 may be performed according to the methods described herein. In some examples, aspects of the operations of 1505 may be performed by a UE SS component as described with reference to FIGS. 5 through 8.

At 1510 the UE 115 may determine a SNR or a received signal power associated with each of the received one or more SS blocks. The operations of 1510 may be performed according to the methods described herein. In some examples, aspects of the operations of 1510 may be performed by a preferred SS block manager as described with reference to FIGS. 5 through 8.

At 1515 the UE 115 may determine the preferred SS block as an SS block having a highest SNR of the determined SNRs or as an SS block having a highest received signal power of the determined received signal powers. The operations of 1515 may be performed according to the methods described herein. In some examples, aspects of the operations of 1515 may be performed by a preferred SS block manager as described with reference to FIGS. 5 through 8.

At 1520 the UE 115 may indicate to the base station 105 the respective RF band of the preferred SS block. The operations of 1520 may be performed according to the methods described herein. In some examples, aspects of the operations of 1520 may be performed by a RF band indication manager as described with reference to FIGS. 5 through 8.

Figure 16:
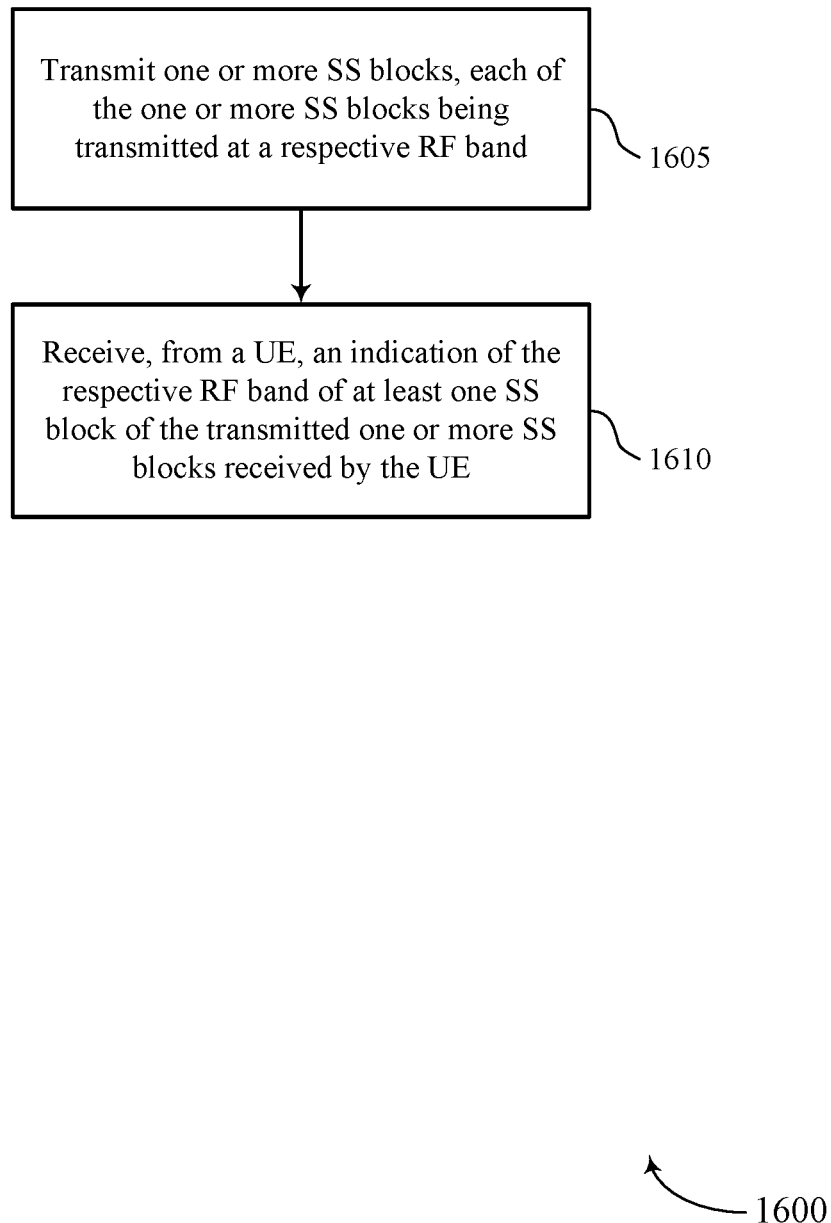

FIG. 16 shows a flowchart illustrating a method 1600 in accordance with aspects of the present disclosure. The operations of method 1600 may be implemented by a base station 105 or its components as described herein. For example, the operations of method 1600 may be performed by a base station SS block manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may transmit one or more SS blocks, each of the one or more SS blocks being transmitted at a respective RF band. The operations of 1605 may be performed according to the methods described herein. In some examples, aspects of the operations of 1605 may be performed by a base station SS component as described with reference to FIGS. 9 through 12.

At 1610 the base station 105 may receive, from a UE 115, an indication of the respective RF band of at least one SS block of the transmitted one or more SS blocks received by the UE 115. The operations of 1610 may be performed according to the methods described herein. In some examples, aspects of the operations of 1610 may be performed by an indication manager as described with reference to FIGS. 9 through 12.

Figure 17:
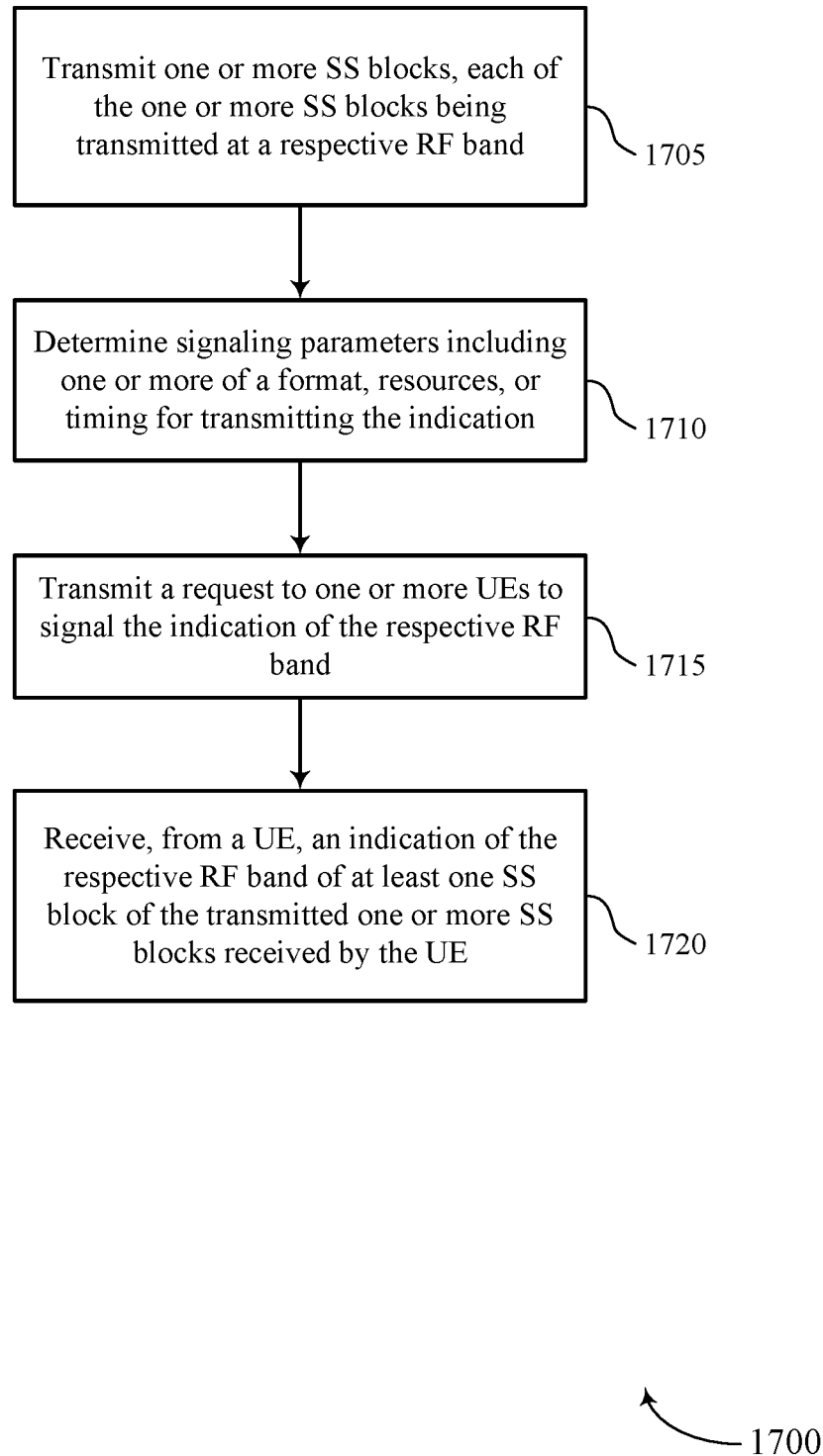

FIG. 17 shows a flowchart illustrating a method 1700 in accordance with aspects of the present disclosure. The operations of method 1700 may be implemented by a base station 105 or its components as described herein. For example, the operations of method 1700 may be performed by a base station SS block manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit one or more SS blocks, each of the one or more SS blocks being transmitted at a respective RF band. The operations of 1705 may be performed according to the methods described herein. In some examples, aspects of the operations of 1705 may be performed by a base station SS component as described with reference to FIGS. 9 through 12.

At 1710 the base station 105 may determine signaling parameters comprising one or more of a format, resources, or timing for transmitting an indication by a UE 115. The operations of 1710 may be performed according to the methods described herein. In some examples, aspects of the operations of 1710 may be performed by a signaling parameter manager as described with reference to FIGS. 9 through 12.

At 1715 the base station 105 may transmit a request to one or more UEs 115 to signal the indication of the respective RF band. In some examples, the request to the one or more UEs may include the determined signaling parameters. The operations of 1715 may be performed according to the methods described herein. In some examples, aspects of the operations of 1715 may be performed by an indication request component as described with reference to FIGS. 9 through 12.

At 1720 the base station 105 may receive, from a UE 115, an indication of the respective RF band of at least one SS block of the transmitted one or more SS blocks received by the UE 115. The operations of 1720 may be performed according to the methods described herein. In some examples, aspects of the operations of 1720 may be performed by an indication manager as described with reference to FIGS. 9 through 12.

Figure 18:
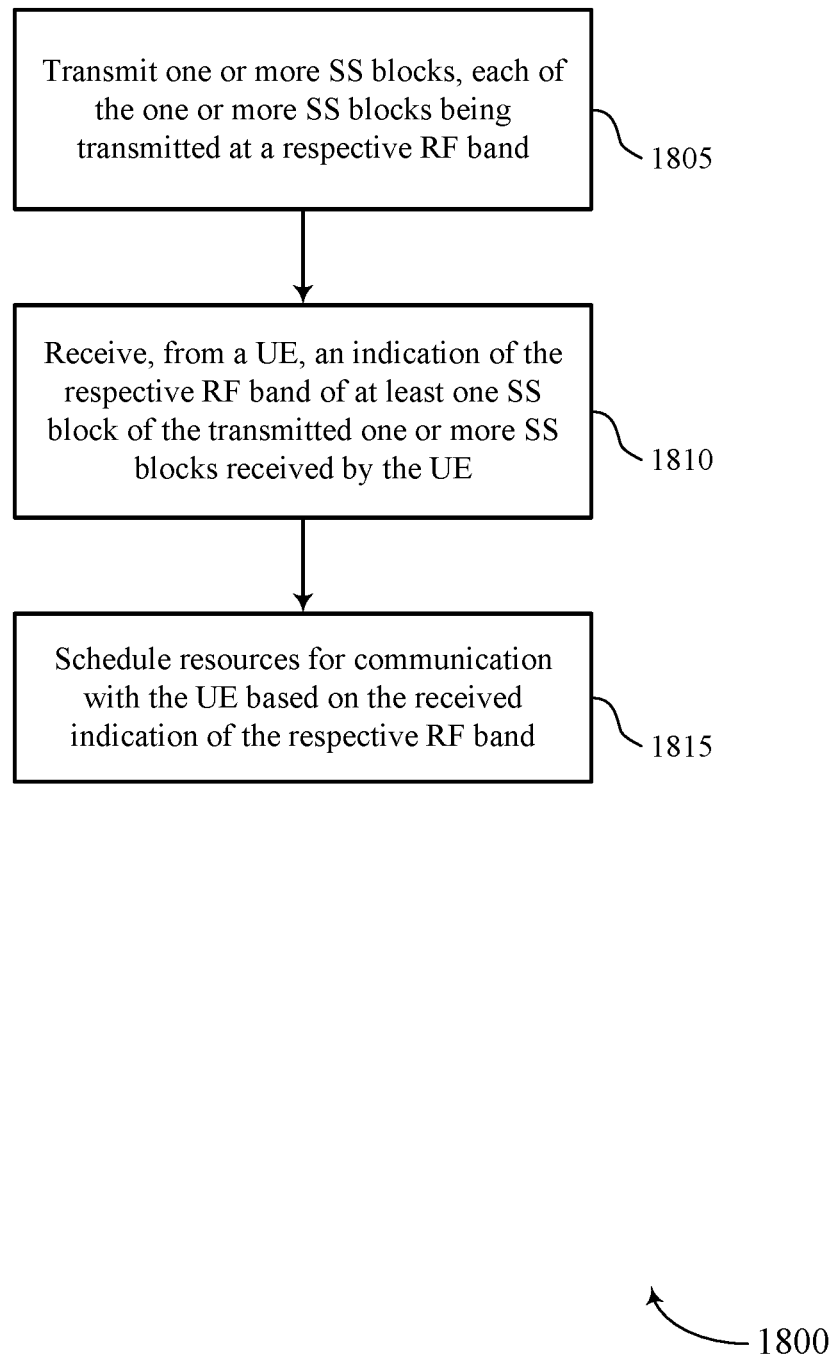

FIG. 18 shows a flowchart illustrating a method 1800 in accordance with aspects of the present disclosure. The operations of method 1800 may be implemented by a base station 105 or its components as described herein. For example, the operations of method 1800 may be performed by a base station SS block manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit one or more SS blocks, each of the one or more SS blocks being transmitted at a respective RF band. The operations of 1805 may be performed according to the methods described herein. In some examples, aspects of the operations of 1805 may be performed by a base station SS component as described with reference to FIGS. 9 through 12.

At 1810 the base station 105 may receive, from a UE 115, an indication of the respective RF band of at least one SS block of the transmitted one or more SS blocks received by the UE 115. The operations of 1810 may be performed according to the methods described herein. In some examples, aspects of the operations of 1810 may be performed by an indication manager as described with reference to FIGS. 9 through 12.

At 1815 the base station 105 may schedule resources for communication with the UE based at least in part on the received indication of the respective RF band. The operations of 1815 may be performed according to the methods described herein. In some examples, aspects of the operations of 1815 may be performed by a resource manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on the context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, at a plurality of radio frequency (RF) bands, one or more synchronization signal (SS) blocks from a base station, each of the one or more SS blocks being received at a respective RF band, wherein the one or more SS blocks comprise a first SS sequence or a second SS sequence;
   identifying, concurrent with or after receiving the one or more SS blocks, a request from the base station to transmit an indication of the respective RF band of a preferred SS block of the one or more SS blocks based at least in part on a determination that the one or more SS blocks comprise the first SS sequence or the second SS sequence;
   determining, in response to the request, the preferred SS block of the one or more SS blocks based at least in part on a signal strength of the one or more SS blocks; and
   transmitting, to the base station, the indication of the respective RF band of the preferred SS block based at least in part on the request.

2. The method of claim 1, further comprising:
   identifying, within the request, signaling parameters comprising one or more of a format, resources, or timing for transmitting the indication; and
   transmitting the indication in accordance with the identified signaling parameters.

3. The method of claim 1, wherein the request is received via a physical broadcast channel (PBCH).

4. The method of claim 1, wherein determining the preferred SS block comprises:
   determining a signal-to-noise ratio (SNR) or a received signal power associated with each of the received one or more SS blocks; and the method further comprising determining the preferred SS block as an SS block having a highest SNR of the determined SNRs or as an SS block having a highest received signal power of the determined received signal powers.

5. The method of claim 1, further comprising:
determining to transmit the respective RF band based at least in part on an SS sequence of the received one or more SS blocks.

6. The method of claim 1, wherein transmitting the indication of the respective RF band comprises:
determining a timing to transmit signaling responsive to receipt of the one or more SS blocks, wherein the timing is indicative of the respective RF band; and
transmitting the signaling in accordance with the determined timing.

7. The method of claim 1, wherein transmitting the indication of the respective RF band comprises:
transmitting, via a random access channel (RACH) message, an index of the respective RF band.

8. The method of claim 1, wherein transmitting the indication of the respective RF band comprises:
indicating, to the base station, a physical resource block (PRB) corresponding to the preferred SS block.

9. The method of claim 1, further comprising:
determining to transmit the respective RF band based at least in part on receiving two or more SS blocks.

10. A method for wireless communication at a base station, comprising:
transmitting one or more synchronization signal (SS) blocks, each of the one or more SS blocks being transmitted at a respective radio frequency (RF) band, the one or more SS blocks comprising a first SS sequence or a second SS sequence;
transmitting to one or more user equipments (UEs), concurrent with or after transmitting the one or more SS blocks, a request to signal an indication of the respective RF band of a preferred SS block, wherein the first SS sequence or the second SS sequence included in the one or more SS blocks was indicative that the base station was to make the request; and
receiving, from a UE of the one or more UEs in response to the request, the indication of the respective RF band of the preferred SS block of the UE.

11. The method of claim 10, further comprising:
determining signaling parameters comprising one or more of a format, resources, or timing for transmission of the indication by the one or more UEs, wherein transmitting the request comprises:
transmitting the determined signaling parameters within the request to the one or more UEs.

12. The method of claim 10, wherein the request is transmitted via a physical broadcast channel (PBCH).

13. The method of claim 10, further comprising:
scheduling resources for communication with the UE based at least in part on the received indication of the respective RF band.

14. The method of claim 10, further comprising:
monitoring resources for communication with the UE based at least in part on the received indication of the respective RF band.

15. The method of claim 10, wherein receiving the indication of the respective RF band comprises:
receiving, via a random access channel (RACH) message, an index of the respective RF band.

16. The method of claim 10, wherein receiving the indication of the respective RF band comprises:
receiving information indicative of a physical resource block (PRB) corresponding to at least one SS block.

17. An apparatus for wireless communication, comprising:
a processor;
memory coupled with the processor; and
instructions stored in the memory and operable, when executed by the processor, to cause the apparatus to:
receive, at a plurality of radio frequency (RF) bands, one or more synchronization signal (SS) blocks from a base station, each of the one or more SS blocks being received at a respective RF band, wherein the one or more SS blocks comprise a first SS sequence or a second SS sequence;
identify, concurrent or after receiving the one or more SS blocks, a request from the base station to transmit an indication of the respective RF band of a preferred SS block of the one or more SS blocks based at least in part on a determination that the one or more SS blocks comprise the first SS sequence or the second SS sequence;
determine, in response to the request, the preferred SS block of the one or more SS blocks based at least in part on a signal strength of the one or more SS blocks; and
transmit, to the base station, the indication of the respective RF band of the preferred SS block based at least in part on the request.

18. The apparatus of claim 17, wherein the instructions are executable by the processor to cause the apparatus to:
identify, within the request, signaling parameters comprising one or more of a format, resources, or timing for transmitting the indication; and
transmit the indication in accordance with the identified signaling parameters.

19. The apparatus of claim 17, wherein the request is received via a physical broadcast channel (PBCH).

20. The apparatus of claim 17, wherein the instructions executable by the processor to cause the apparatus to determine the preferred SS block comprise instructions executable by the processor to cause the apparatus to:
determine a signal-to-noise ratio (SNR) or a received signal power associated with each of the received one or more SS blocks; and
determine the preferred SS block as an SS block having a highest SNR of the determined SNRs or as an SS block having a highest received signal power of the determined received signal powers.

21. The apparatus of claim 17, wherein the instructions executable by the processor to cause the apparatus to transmit the indication of the respective RF band comprise instructions executable by the processor to cause the apparatus to:
determine a timing to transmit signaling responsive to receipt of the one or more SS blocks, wherein the timing is indicative of the respective RF band; and
transmit the signaling in accordance with the determined timing.

22. An apparatus for wireless communication, comprising:
a processor;
memory coupled with the processor; and
instructions stored in the memory and operable, when executed by the processor, to cause the apparatus to:
transmit one or more synchronization signal (SS) blocks, each of the one or more SS blocks being transmitted at a respective radio frequency (RF) band, the one or more SS blocks comprising a first SS sequence or a second SS sequence;

transmit to one or more user equipments (UEs), concurrent with or after transmission of the one or more SS blocks, a request to signal an indication of the respective RF band of a preferred SS block, wherein the first SS sequence or the second SS sequence included in the one or more SS blocks was indicative that the apparatus was to make the request; and receive, from a UE of the one or more UEs in response to the request, the indication of the respective RF band of the preferred SS block of the UE.

23. The apparatus of claim 22, wherein the instructions are executable by the processor to cause the apparatus to:
determine signaling parameters comprising one or more of a format, resources, or timing for transmission of the indication by the one or more UEs, wherein the instructions executable by the processor to cause the apparatus to transmit the request comprise instructions executable by the processor to cause the apparatus to:
transmit the determined signaling parameters within the request to the one or more UEs.

24. The apparatus of claim 22, wherein the request is transmitted via a physical broadcast channel (PBCH).

25. The apparatus of claim 22, wherein the instructions are executable by the processor to cause the apparatus to:
schedule resources for communication with the UE based at least in part on the received indication of the respective RF band.

26. The apparatus of claim 22, wherein the instructions are executable by the processor to cause the apparatus to:
monitor resources for communication with the UE based at least in part on the received indication of the respective RF band.

* * * * *